(12) United States Patent
Burks et al.

(10) Patent No.: US 11,111,033 B1
(45) Date of Patent: Sep. 7, 2021

(54) UNMANNED AERIAL VEHICLE RECHARGING SYSTEM

(71) Applicant: Phirst Technologies, LLC, Tyler, TX (US)

(72) Inventors: Philip E. Burks, Tyler, TX (US); Ryan E. LaBarre, Clinton, WA (US); Trent S. Clawson, Chubbuck, ID (US); Jack Edgar Terrell, Tyler, TX (US); Brandon Shawn Kirkpatrick, Lindale, TX (US)

(73) Assignee: PHIRST TECHNOLOGIES, LLC, Tyler, TX (US)

( * ) Notice: Subject to any disclaimer, the term of this patent is extended or adjusted under 35 U.S.C. 154(b) by 0 days.

(21) Appl. No.: 17/118,591

(22) Filed: Dec. 10, 2020

Related U.S. Application Data

(63) Continuation-in-part of application No. 17/008,138, filed on Aug. 31, 2020, which is a continuation-in-part of application No. 16/849,593, filed on Apr. 15, 2020, which is a continuation-in-part of application No. 15/978,060, filed on May 11, 2018.

(60) Provisional application No. 62/834,264, filed on Apr. 15, 2019, provisional application No. 62/613,641, filed on Jan. 4, 2018, provisional application No. 62/505,205, filed on May 12, 2017.

(51) Int. Cl.
*B64F 1/22* (2006.01)
*B64C 39/02* (2006.01)

(52) U.S. Cl.
CPC ............ *B64F 1/222* (2013.01); *B64C 39/024* (2013.01); *B64C 2201/201* (2013.01)

(58) Field of Classification Search
CPC .. B64F 1/222; B64C 39/024; B64C 2201/201
See application file for complete search history.

(56) References Cited

U.S. PATENT DOCUMENTS

| | | |
|---|---|---|
| 3,083,935 A | 4/1963 | Piasecki |
| 5,407,150 A | 4/1995 | Sadleir |
| 9,307,383 B1 | 4/2016 | Patrick |
| 9,387,928 B1 * | 7/2016 | Gentry ................. G08G 5/0052 |

(Continued)

FOREIGN PATENT DOCUMENTS

WO 2016196093 A1 12/2016

OTHER PUBLICATIONS

Al-Obaidi et al., "Charging Platform of Chess-Pad Configuration for Unmanned Aerial Vehicle (UAV)" (Year: 2020).*

(Continued)

*Primary Examiner* — Assres H Woldemaryam
(74) *Attorney, Agent, or Firm* — Perkins Coie LLP

(57) ABSTRACT

A recharging system operable to supply power to a rechargeable battery onboard an aerial vehicle. The recharging system includes conductive contacts onboard an aerial vehicle and a landing platform including conductive regions, a charge sensor, and a power supply. The conductive contacts are polarized and located on the skids of the aerial vehicle. When then conductive contacts are received by the conductive regions, the charge sensor operates switches in order to connect a positively charged contact with the positive terminal of the power supply and the negatively charged contact with the negative terminal. Thus, the rechargeable battery is recharged by the power supply.

28 Claims, 36 Drawing Sheets

(56) References Cited

U.S. PATENT DOCUMENTS

| | | | |
|---|---|---|---|
| 9,646,498 B1 | 5/2017 | Brandt et al. | |
| 9,650,133 B2 | 5/2017 | Fisher et al. | |
| 9,864,372 B2 | 1/2018 | Chen et al. | |
| 9,873,524 B2 | 1/2018 | Fisher et al. | |
| 9,880,563 B2 | 1/2018 | Fisher et al. | |
| 9,928,749 B2* | 3/2018 | Gil | G08G 5/025 |
| 9,977,435 B2 | 5/2018 | Fisher et al. | |
| 10,913,546 B2 | 2/2021 | Krauss et al. | |
| 2006/0192045 A1 | 8/2006 | Uchiumi et al. | |
| 2007/0057113 A1 | 3/2007 | Parks | |
| 2007/0246601 A1 | 10/2007 | Layton | |
| 2016/0200438 A1* | 7/2016 | Bokeno | B60L 53/53 244/2 |
| 2016/0214710 A1 | 7/2016 | Brody et al. | |
| 2016/0311329 A1* | 10/2016 | Rodriguez | B60L 53/126 |
| 2016/0364989 A1 | 12/2016 | Speasl et al. | |
| 2017/0021941 A1 | 1/2017 | Fisher et al. | |
| 2017/0021942 A1 | 1/2017 | Fisher et al. | |
| 2017/0092138 A1 | 3/2017 | Trundle et al. | |
| 2017/0106986 A1 | 4/2017 | Sweeny et al. | |
| 2017/0144776 A1 | 5/2017 | Fisher et al. | |
| 2017/0225799 A1 | 8/2017 | Selwyn et al. | |
| 2018/0029723 A1* | 2/2018 | Krauss | B64F 1/00 |
| 2018/0074488 A1* | 3/2018 | Cantrell | G06Q 10/06311 |
| 2018/0101182 A1 | 4/2018 | Fisher et al. | |
| 2018/0148170 A1 | 5/2018 | Stamatovski | |
| 2018/0194491 A1 | 7/2018 | Fisher et al. | |
| 2018/0239369 A1 | 8/2018 | Fisher et al. | |
| 2019/0140457 A1* | 5/2019 | Dong | H01M 10/6235 |
| 2019/0202578 A1 | 7/2019 | Fox et al. | |
| 2020/0001735 A1* | 1/2020 | Cheng | G08G 5/0069 |
| 2020/0165008 A1 | 5/2020 | Krauss et al. | |

OTHER PUBLICATIONS

Easy Aerial Inc. website accessed Mar. 2, 2021, from https://easyaerial.com/, 17 pages.

International Search Report and Written Opinion for International Application No. PCT/US2018/032459; dated Sep. 27, 2018; 15 pages.

Nightingale Security Brochure dated Aug. 29, 2020, accessed Mar. 2, 2021, from https://www.nightingalesecurity.com/; 16 pages.

Azur Drones website, accessed Mar. 2, 2021, at http://www.azurdrones.com/; 4 pages.

Ai/Robotics website, accessed Mar. 2, 2021, at http://www.airobotics.com/; 3 pages.

\* cited by examiner

UNMANNED AERIAL VEHICLE RECHARGING SYSTEM

CROSS-REFERENCE TO RELATED APPLICATIONS

This application is a continuation-in-part of a U.S. patent application Ser. No. 17/008,138, filed Aug. 31, 2020, which is a continuation-in-part of U.S. patent application Ser. No. 16/849,593, filed Apr. 15, 2020, which claims the benefit of and priority to U.S. Provisional Patent Application No. 62/834,264, filed Apr. 15, 2019, and which is a continuation-in-part of U.S. patent application Ser. No. 15/978,060, filed May 11, 2018, which claims the benefit of U.S. Provisional Patent Application No. 62/505,205, filed May 12, 2017, and U.S. Provisional Patent Application No. 62/613,641, filed Jan. 4, 2018, the disclosures of which are incorporated herein by reference in their entireties.

TECHNICAL FIELD

This patent application is directed to recharging unmanned aerial vehicle infrastructure, and more specifically, to automated recharging ports for housing unmanned aerial vehicles.

BACKGROUND

In typical emergency response situations, dispatchers at emergency call centers (also referred to as computer-aided dispatch centers) receive a call related to the emergency and thereafter respond to the emergency by dispatching response units (generally termed as first responders) to the location of the emergency. However, the call related to the emergency often provides very little information about the emergency. As a result, the dispatcher's knowledge of the emergency is limited to the "description" of the emergency provided in the call. Thus, there exists a need for a new perspective that can help in determining how to use resources effectively in responding to emergency situations.

BRIEF DESCRIPTION OF THE DRAWINGS

The unmanned aerial vehicle ports described herein may be better understood by referring to the following Detailed Description in conjunction with the accompanying drawings, in which like reference numerals indicate identical or functionally similar elements.

Figure 1:
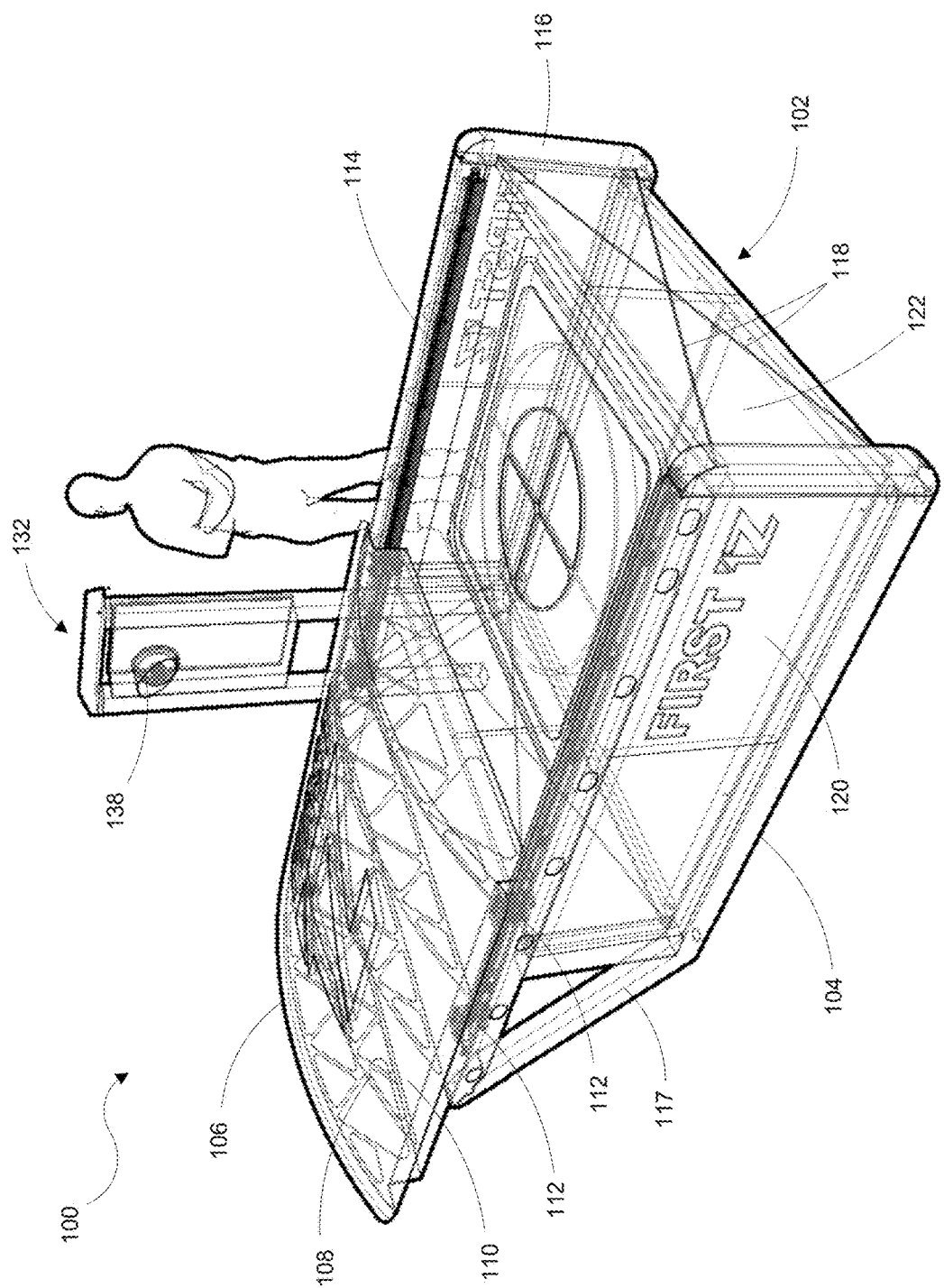
FIG. 1 is a partially transparent perspective view of an unmanned aerial vehicle port according to a first representative embodiment as viewed from the front.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the devices introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

Disclosed herein are unmanned aerial vehicle ports, also referred to herein as drone ports and UAV ports. An autonomous drone can reside in the drone port ready for deployment. The drone can be powered during storage such that the drone's GPS and other flight systems are current with position information allowing the drone to be quickly deployed in emergency situations. The drone ports disclosed herein can be located near emergency facilities, such as fire stations, police stations, or dispatch centers, for example. A drone housed in one of these drone ports can be deployed immediately upon receiving an emergency call (e.g., 911 call). Once deployed, the drone provides a camera feed to emergency responders, thereby providing situational information to the responders prior to departure and/or arrival to the scene of an emergency. Accordingly, the responders can be better prepared to address the situation. In some embodiments, the camera feed can be distributed via the FirstNet PS-LTE broadband network. The disclosed technology can be used in conjunction with systems for responding to emergency situations, such systems described in U.S. patent application Ser. No. 15/978,060, filed May 11, 2018, the disclosure of which is hereby incorporated by reference in its entirety.

Figure 2:
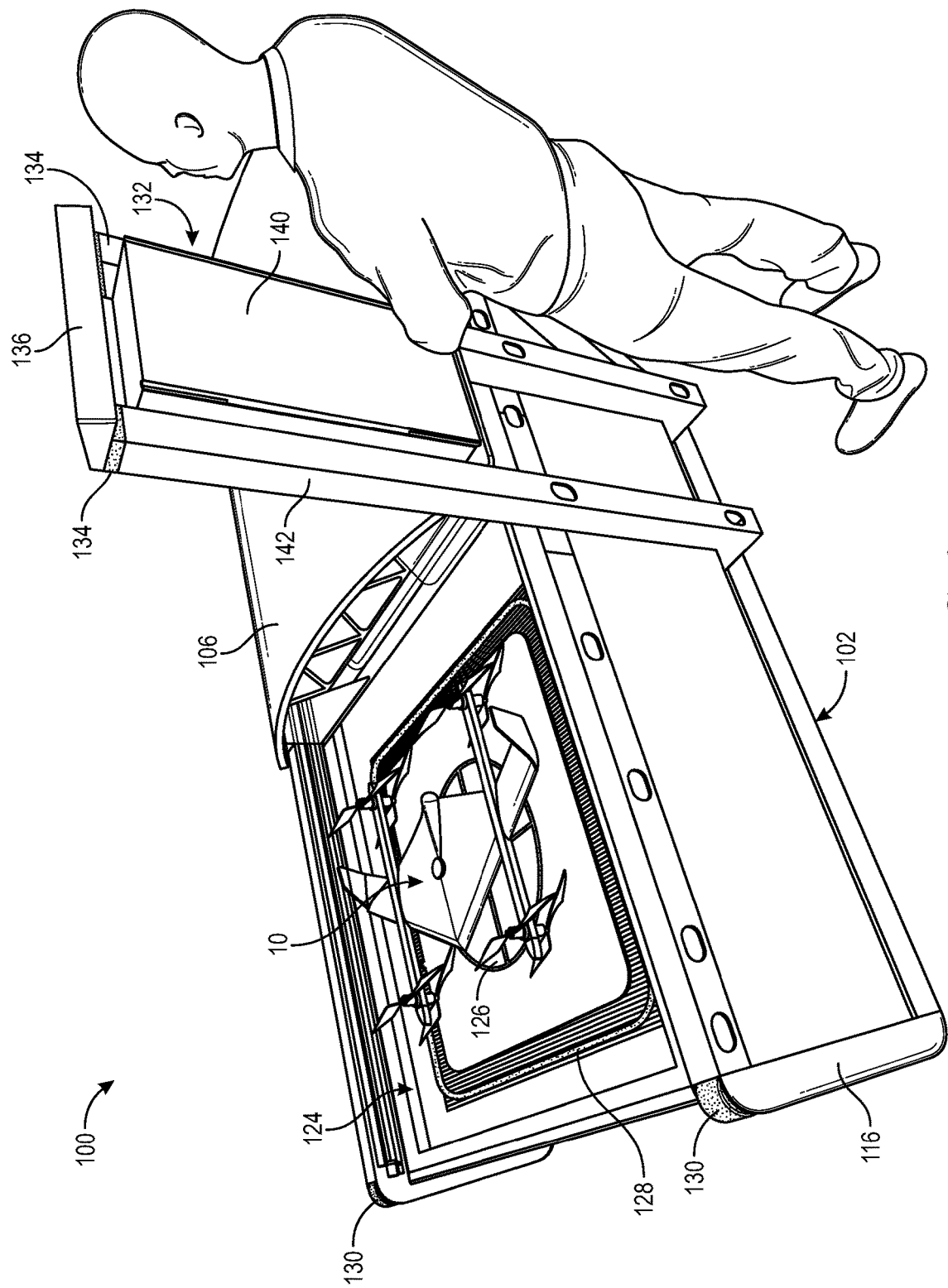
FIG. 2 is a perspective view of the unmanned aerial vehicle port of FIG. 1 as viewed from the back.
Figure 3A:
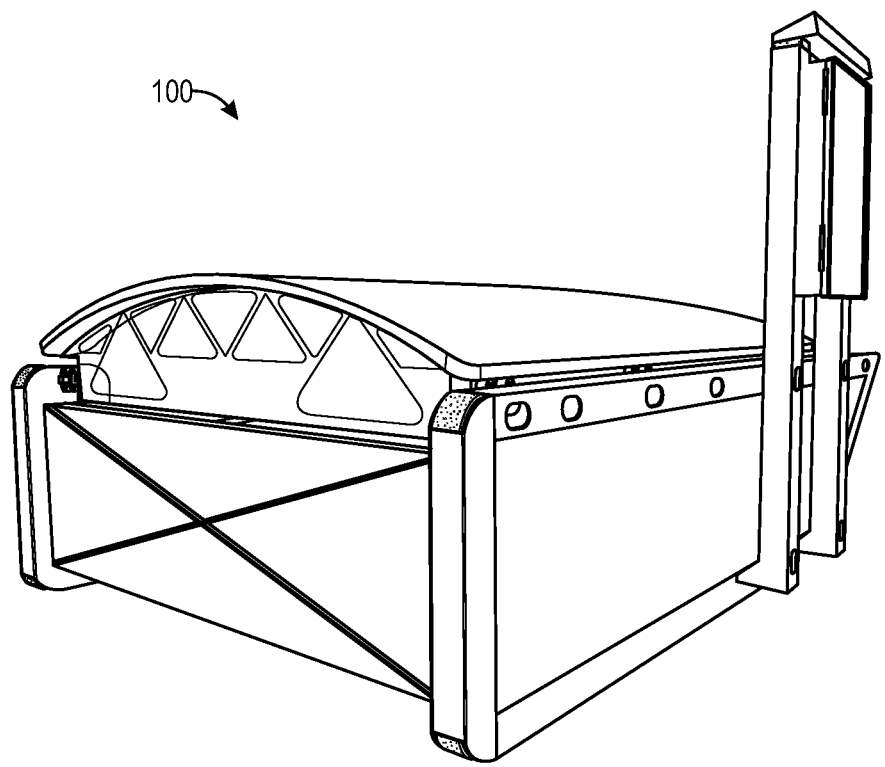
FIG. 3A is a perspective view of the unmanned aerial vehicle port of FIGS. 1 and 2 as viewed from the side and with the top hatch closed.
Figure 3B:
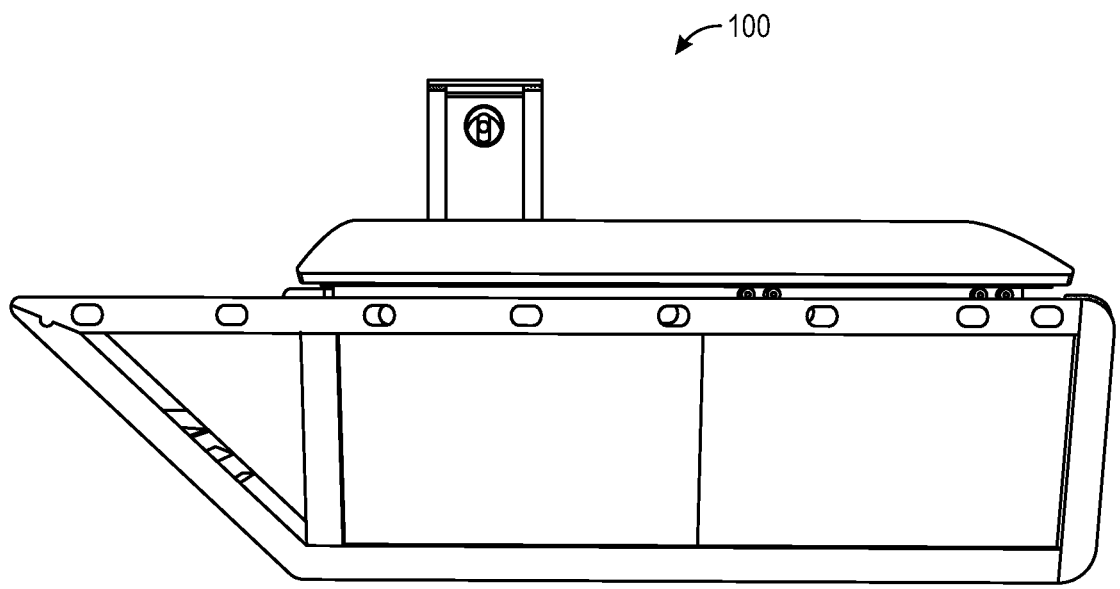
FIG. 3B is a front view of the unmanned aerial vehicle port of FIG. 3A.

As shown in FIG. 1, the disclosed drone port 100 can include an enclosure 102 comprising a container base 104, also referred to as a container, with a movable roof, in the form of a top hatch or cover 106. The hatch 106 can include a frame having a plurality of trusses 108 enclosed with a covering 110. In the depicted embodiment, the top hatch 106 includes bearings blocks 112 slideable along bearing rails 114 mounted to frame 116 of the container base 104. Accordingly, the top hatch 106 is horizontally slideable relative to the container base 104 between a retracted or open position (as shown in FIGS. 1 and 2) and a closed position (as shown in FIGS. 3A and 3B). In some embodiments, the trusses 108 can comprise aluminum, polycarbonate, or other suitable material and the covering 110 can comprise e.g., foam sheet having a thickness of approximately one inch, for example. In some embodiments, the cover 110 can include radio frequency transparent materials in order to allow a UAV positioned in the enclosure to maintain communication with GPS signals even with the hatch in the closed position. This allows the UAV to deploy immediately upon opening the hatch without any delay for the UAV to update its GPS positioning.

The frame 116 can include two cantilever portions 117 positioned to support the hatch 106 when it is in the retracted position. The frame 116 can be comprised of aluminum tube, such as three inch 6063 aluminum, or other suitable frame material. In some embodiments, the frame 116 is reinforced with cross-braces 118. The frame 116 can be sheathed with panels 120 and 122 comprising sheet metal, foam, polycarbonate, or other suitable sheathing material.

In some embodiments, the drone port 100 can include a movable modular tower 132 coupled to the frame 116. The tower 132 can support a camera 138 positioned to view the drone port 100 to provide status and security information. With further reference to FIG. 2, the tower 132 can include a pair of tower supports 142 extending upwardly from the frame 116 to support one or more status/launch lights 134, a sensor array 136, access/utility panel 140, and/or an HVAC unit to control the environment within the enclosure 102. In some embodiments, the sensor array 136 can include sensors to monitor the ambient weather (in or around the drone port) such as a barometer, a thermometer, an anemometer or otherwise and any mechanical or electrical weather equipment. The frame 116 can also include status/launch lights 130 located at corners of the frame, for example. When the hatch 106 is in the retracted position, a drone bay 124 is accessible for a UAV, such as drone 10, to take off and land. The drone bay 124 can include a vertically articulating platform 126 to accommodate taller UAV's. In other words, the platform 126 can move up and down within the drone bay 124 between a lower aerial vehicle stowed position, and an upper aerial vehicle deploy position to facilitate UAV takeoff and landing. The platform can be positioned on a scissor-lift or linear actuator in order to raise and lower the platform 126. In some embodiments, the platform 126 can carry a charging/docking pad. The platform 126 can also include a turntable to allow automated UAV compass calibrations. The platform 126 can also include status/launch lights 128 extending around an outer perimeter portion of the platform 126. These lights can comprise LED strip lights, for example.

Figure 4:
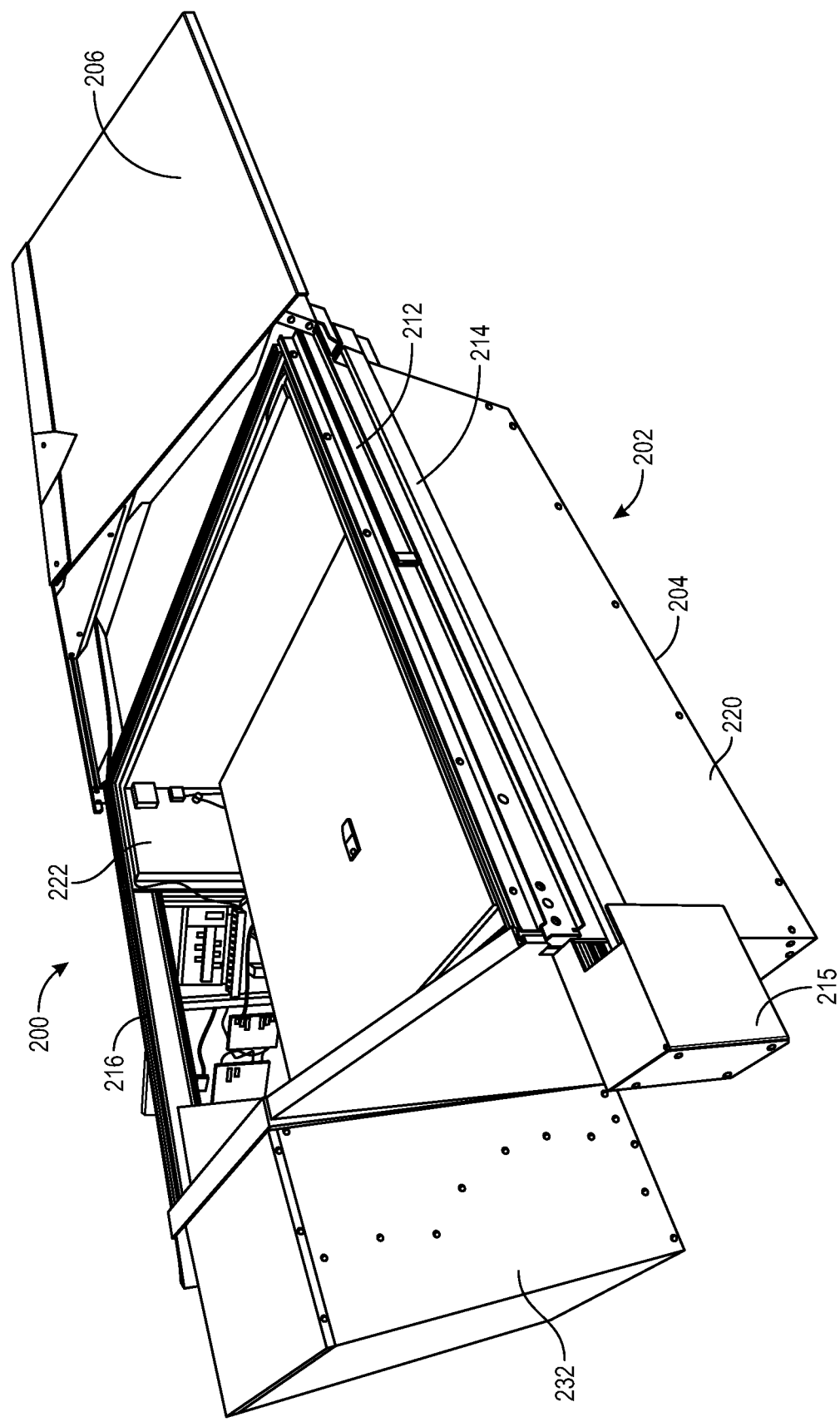
FIG. 4 is a perspective view of an unmanned aerial vehicle port according to another representative embodiment as viewed from the front.

FIG. 4 illustrates a drone port 200 according to another representative embodiment. The drone port 200 can include an enclosure 202 comprising a container base 204 with a movable top hatch or cover 206. In the depicted embodiment, the top hatch 206 travels on telescoping slides 212 (e.g., drawer slides) attached to the container base 204. Accordingly, the top hatch 206 is horizontally slideable relative to the container base 204 between a retracted or open position and a closed position. The top hatch 206 can be automatically operated with a linear actuator 214 and associated drive system 215 (e.g., electric motor). The container base 204 can include a frame 216 sheathed on the outside with sheet metal 220 or polycarbonate, for example. The inside of the frame 216 can be lined with foam 222 to help insulate the interior of the enclosure from temperature changes. In some embodiments, the frame 216 can comprise aluminum framing extrusion, for example. The top hatch 206 can have a similar construction as that described above for the container base 204. In some embodiments, the drone port 200 can include an HVAC system 232 coupled to the container base 204 to provide temperature control within the container.

Figure 5:
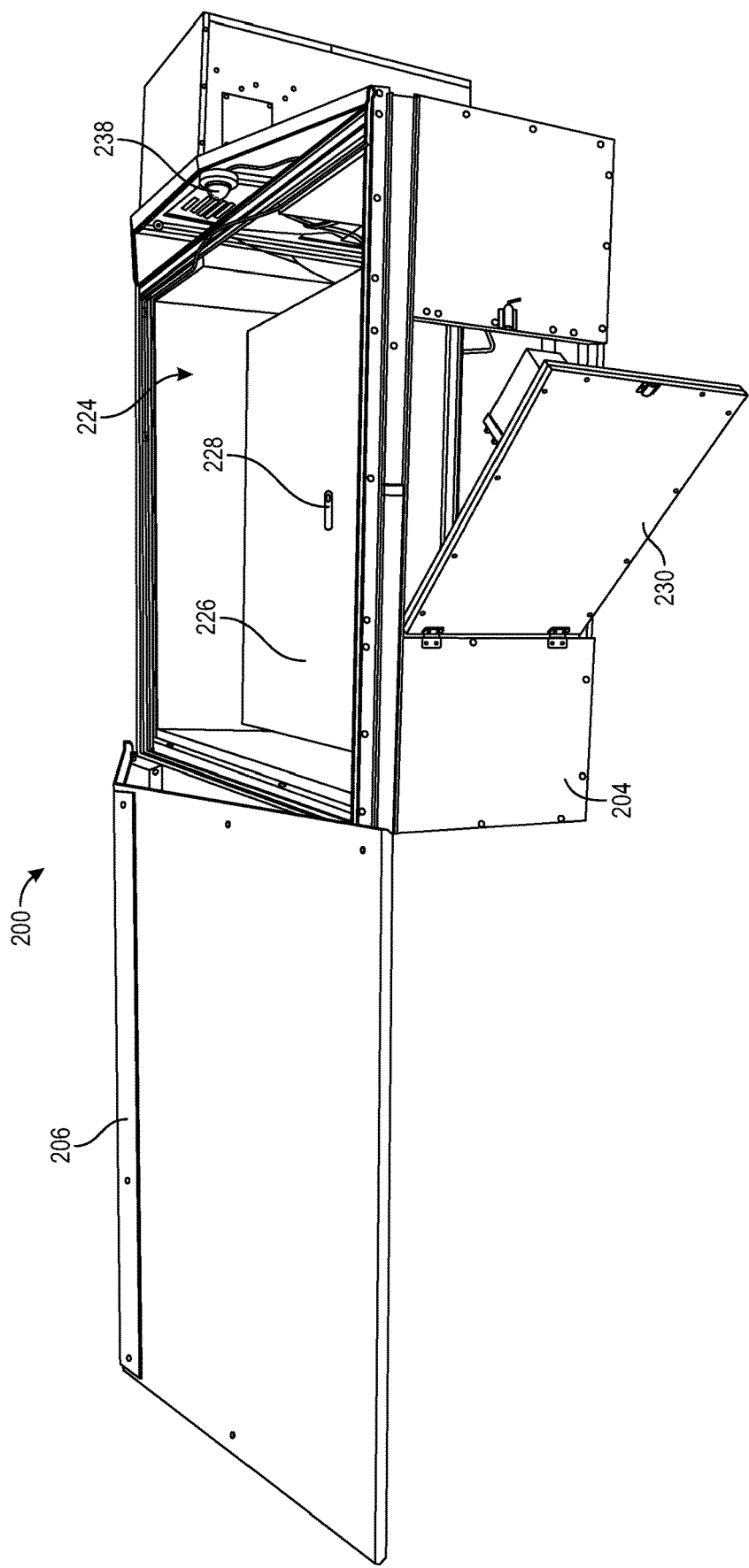
FIG. 5 is a perspective view of the unmanned aerial vehicle port of FIG. 4 as viewed from the back.

With reference to FIG. 5, when the hatch 206 is in the retracted position, a drone bay 224 is accessible for a UAV to take off and land. The drone bay 224 can include a vertically articulating platform 226 to accommodate taller UAV's. The platform can be positioned on a scissor-lift or linear actuator in order to raise and lower the platform 226. In some embodiments, the platform 226 can carry an infrared emitter 228 to guide an approaching drone for automated landing on the platform 226. In some embodiments, the drone bay 224 can house an interior camera 238 to provide status of a drone housed in the drone bay 224. An access panel 230 can be provided in the side of the container base 204 to allow access to the platform lift actuator and controls.

Figure 6:
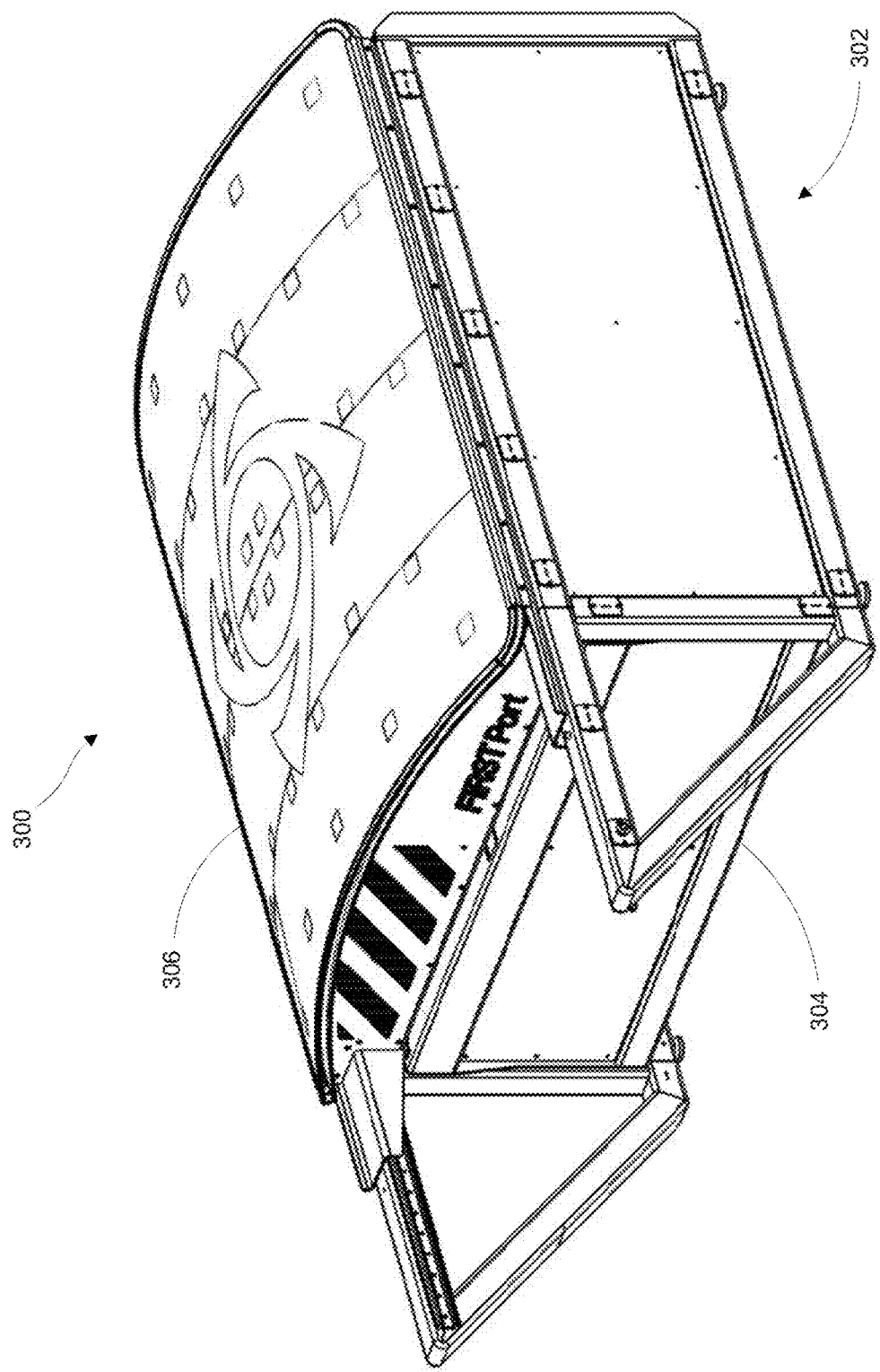
FIG. 6 is an isometric view of an unmanned aerial vehicle port according to a further representative embodiment as viewed from the side.
Figure 7:
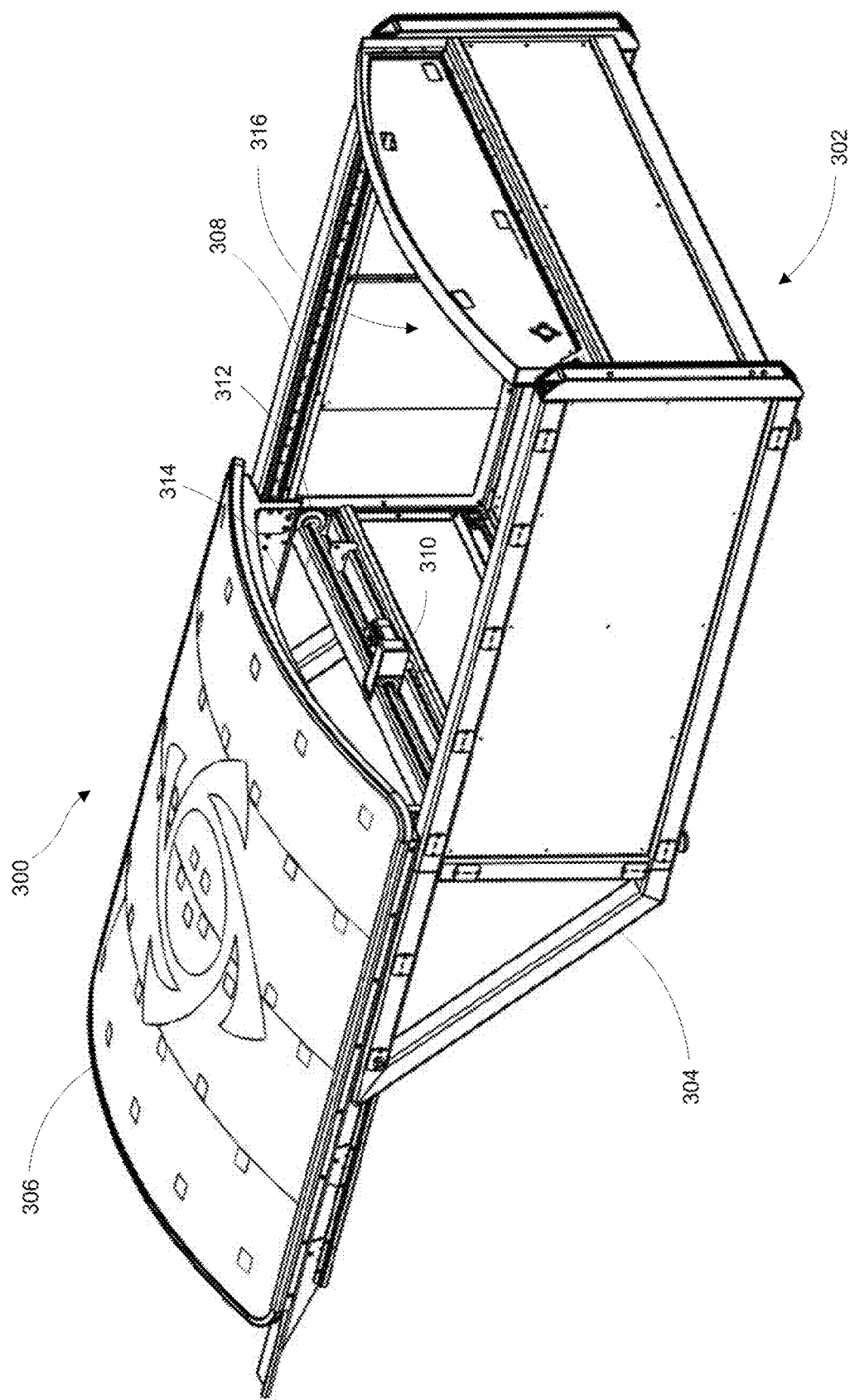
FIG. 7 is an isometric view of the unmanned aerial vehicle port of FIG. 6 as viewed from the front.

FIG. 6 illustrates a drone port 300 according to a further representative embodiment. The drone port 300 can include an enclosure 302 comprising a container 304 with a movable roof, in the form of a top hatch or cover 306. With further reference to FIG. 7, the top hatch 306 is moveable along bearing rails 308 mounted to the container 304. Accordingly, the top hatch 306 is horizontally moveable relative to the container 304 between a closed position (as shown in FIG. 6) and a retracted or open position (as shown in FIG. 7). In the depicted embodiment, the movement of the top hatch 306 can be automated with a gear motor 310 driving a pair of pinion gears 312 (only one gear visible), each of which meshes with a corresponding rack 314 attached to the top hatch 306. When the hatch 306 is in the retracted position, a drone bay 316 is accessible for a UAV 10 (FIG. 2) to take off and land. In some embodiments, the drone bay 316 can include a vertically articulating platform as described below with respect to FIGS. 12-15.

Figure 8:
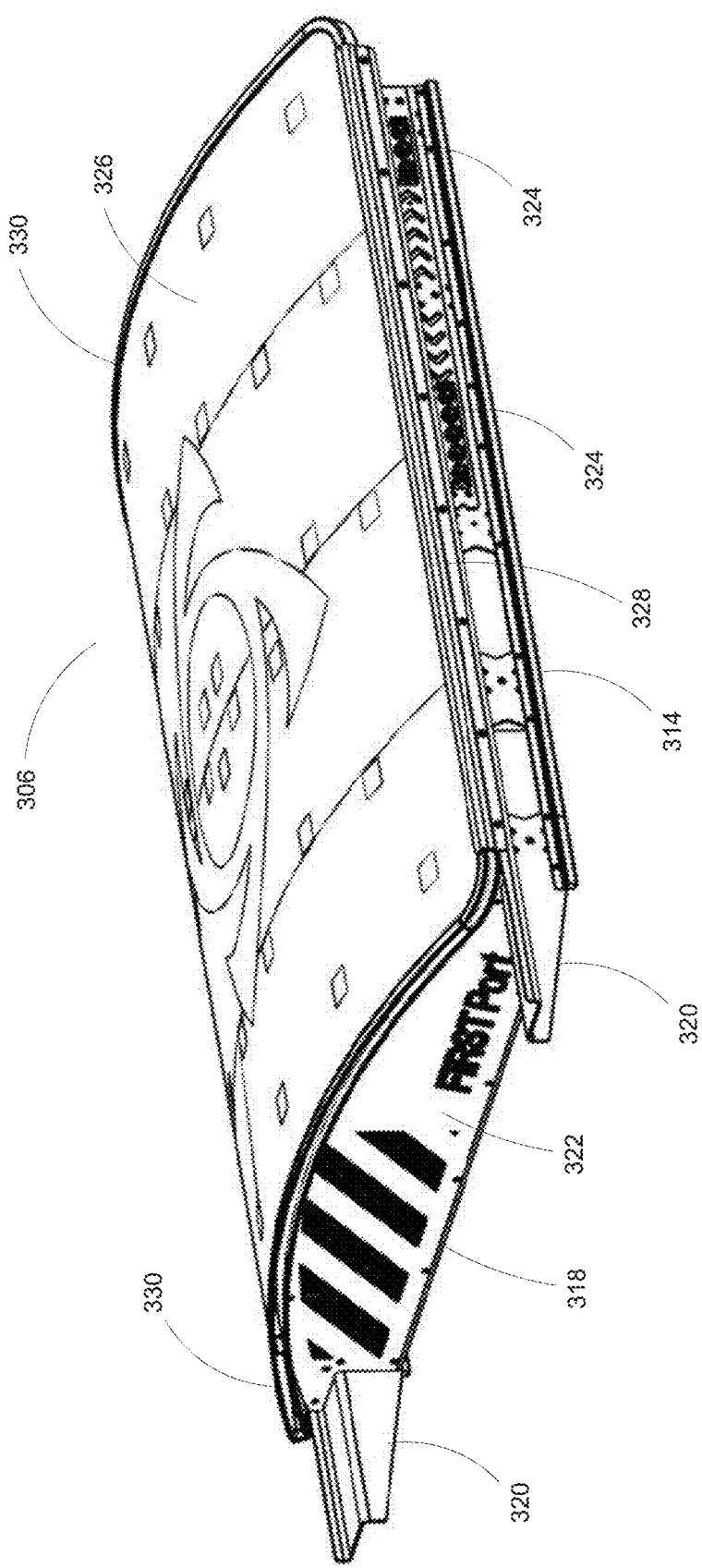
FIG. 8 is an isometric view of the top hatch shown in FIGS. 6 and 7.

FIG. 8 illustrates the top hatch 306 which includes a hatch frame 318 and a covering 326 attached thereto. The hatch frame 318 can include a pair of parallel side rails 320 with end plates 322 extending therebetween. In some embodiments, the side rails 320 extend beyond the end plate 322 to help protect the top hatch drive mechanism from the elements. Each side rail 320 carries a plurality of roller bearings 324 that travel in bearing rails 308 (FIG. 7). In some embodiments, the rollers are grouped and arranged on carriages, such as those available from Redi-Rail® of Roscoe, Ill., for example. Each side rail 320 also carries a corresponding one of the gear racks 314. The covering 326 can include a multilayer panel construction that is surrounded by cooperative roof clips 328 and end cap channels 330.

Figure 9:
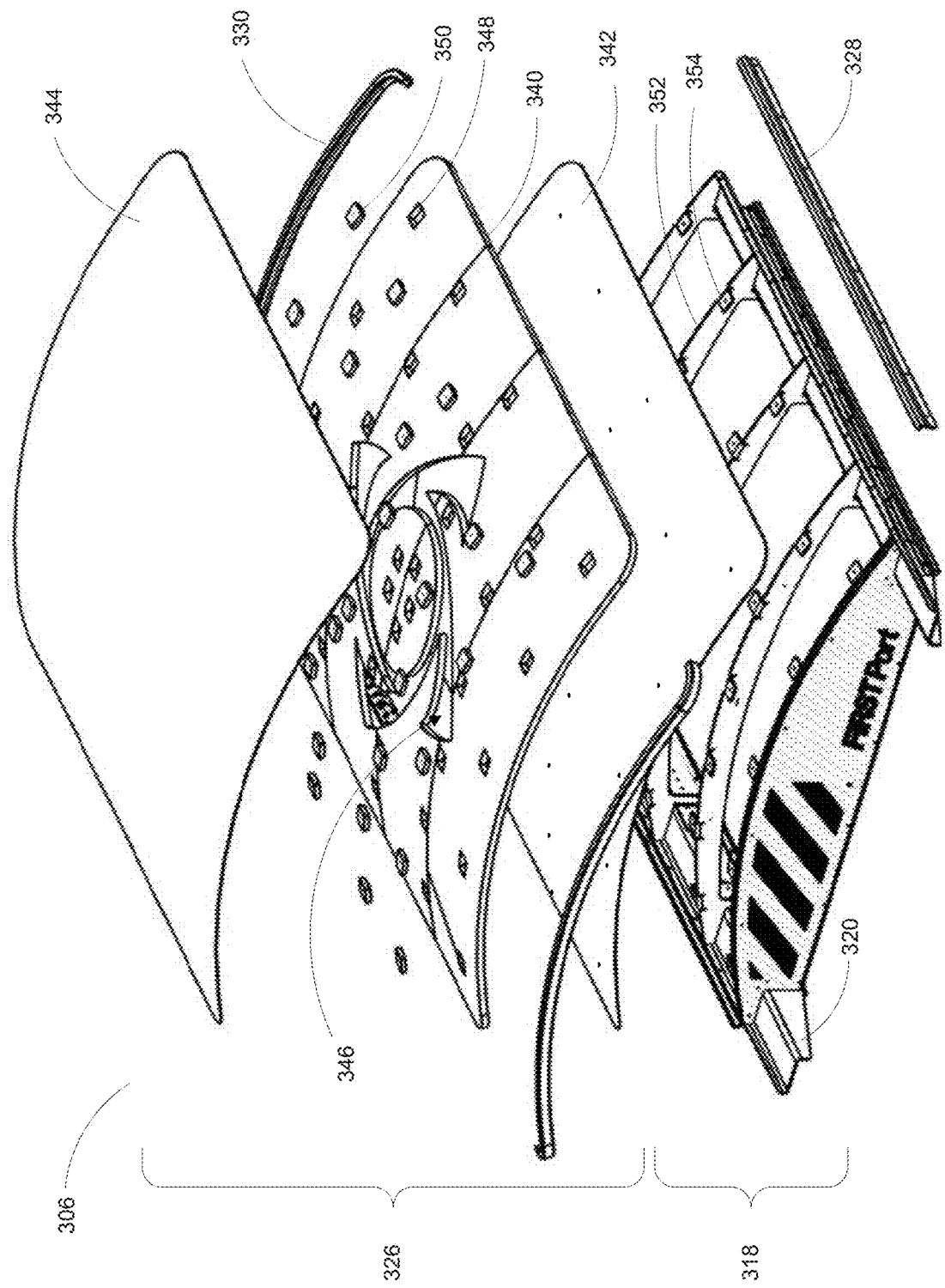
FIG. 9 is an exploded isometric view of the top hatch shown in FIGS. 6-8.

FIG. 9 illustrates the construction of the top hatch 306. In some embodiments, the hatch frame 318 includes multiple trusses or ribs 352 extending between the side rails 320. The covering 326 can include three layers of materials comprising a foam core 340 sandwiched between inner and outer polycarbonate sheets 342 and 344, respectively. In some embodiments, the foam core 340 can comprise multiple sheets butted together, as shown. The foam core 340 and the inner sheet 342 are attached to mounting tabs 354 that extend from the ribs 352. Multiple fasteners (not shown) extend through the mounting tabs 354, the inner sheet 342, and the foam core 340 to engage corresponding plugs 350, whereby the core 340 and inner sheet 342 are captured between the tabs 354 and the plugs 350. The core 340 can include multiple apertures 348 each positioned and shaped to receive a corresponding plug 350. The outer sheet 344 can be attached to the foam core 340 with reclosable fastener material, as described further below with reference to FIG. 10. Once the foam core 340 and the inner and outer polycarbonate sheets 342 and 344 are sandwiched together the end cap channels 330 are positioned on the ends of the covering 326 and the roof clips 328 are attached to rails 320 to clamp the edges of the covering 326 and to facilitate sealing the edges of the covering. In some embodiments, a UV stable tape/caulk is positioned between the roof clips 328 and the outer sheet 344 to seal the edge of the hatch and to add strength to the hatch to resist racking, for example.

The covering 326 can comprise radio frequency transparent materials in order to allow a UAV positioned in the enclosure to maintain communication with GPS signals even with the hatch 306 in the closed position. For example, the core 340 can comprise Last-A-Foam® TF-6070-8.5LB flexible polyurethane foam which is available from General Plastics Manufacturing of Tacoma, Wash. This allows the UAV to deploy immediately upon opening the hatch without any delay for the UAV to update its GPS positioning. In some embodiments, one or more centrally located openings 346 can be formed through the core 340 to further enhance the ability of the UAV to maintain communication with GPS signals.

Figure 10:
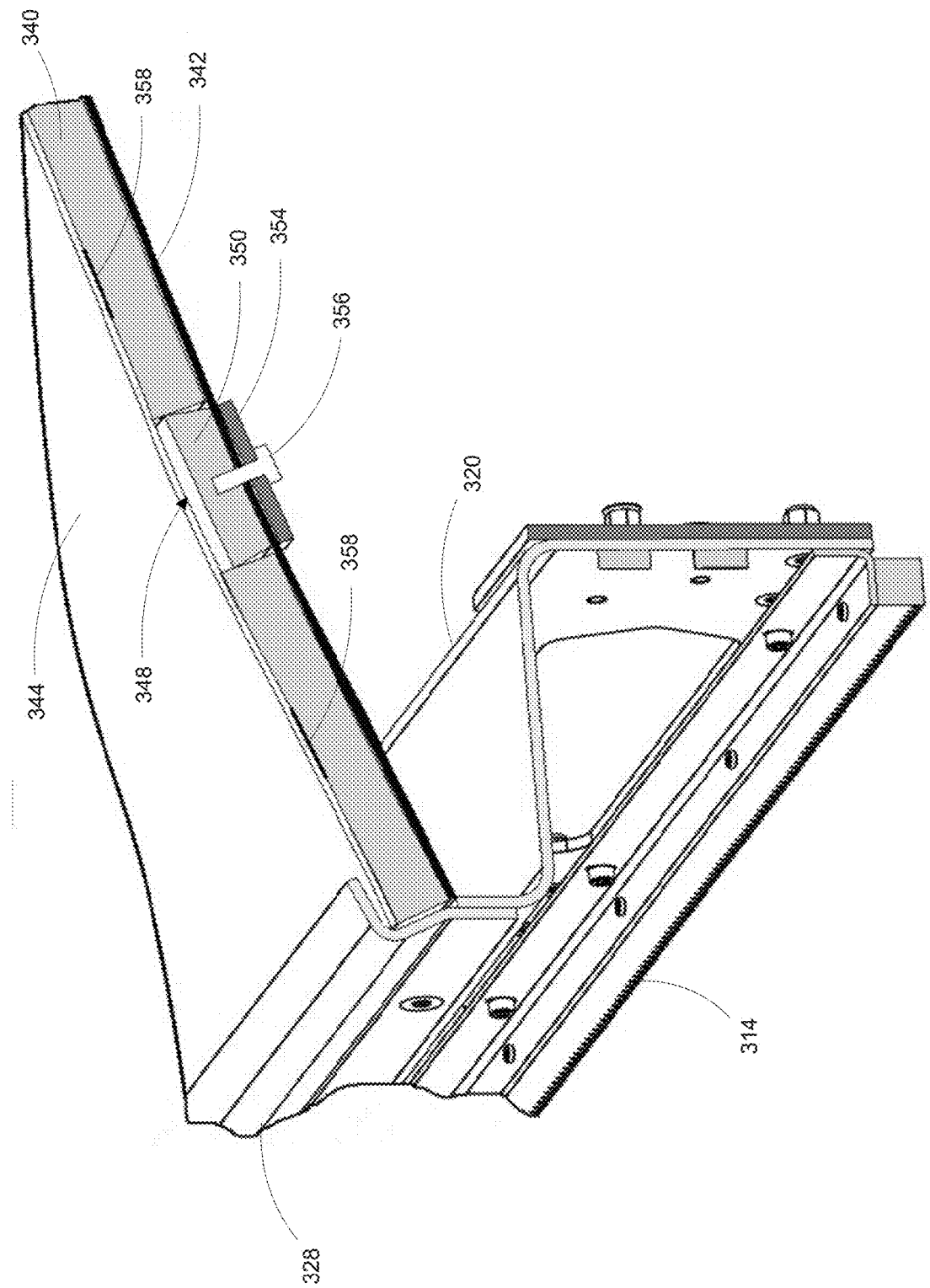
FIG. 10 is a partial isometric cross-section illustrating the construction of the top hatch.

FIG. 10 shows a portion of the hatch 306 in cross-section illustrating the attachment of the covering 326 to the hatch frame 318. As noted above, a fastener 356 extends through an aperture in the tab 354 to thread into the plug 350. In some embodiments, the fastener 356 and plug 350 comprise plastic to keep the covering as radio frequency transparent as possible. The plugs 350 can be tapered as shown in order to securely engage the apertures 348. In some embodiments, the apertures 348 can be sized to correspond with the tapered end of the plugs 350. Although the plugs 350 are shown as being square, other suitable shapes can be used. The cooperative reclosable fastener material 358 used to attach the outer sheet 344 can be 3M™ Dual Lock™. In some embodiments, the outer sheet 344 can be attached with cooperative hook and loop material, such as Velcro®. Fastening the inside of the outer sheet 344 to the core 340 with reclosable fastener material, provides an uninterrupted outer surface to help keep the port weather resistant.

Figure 11A:
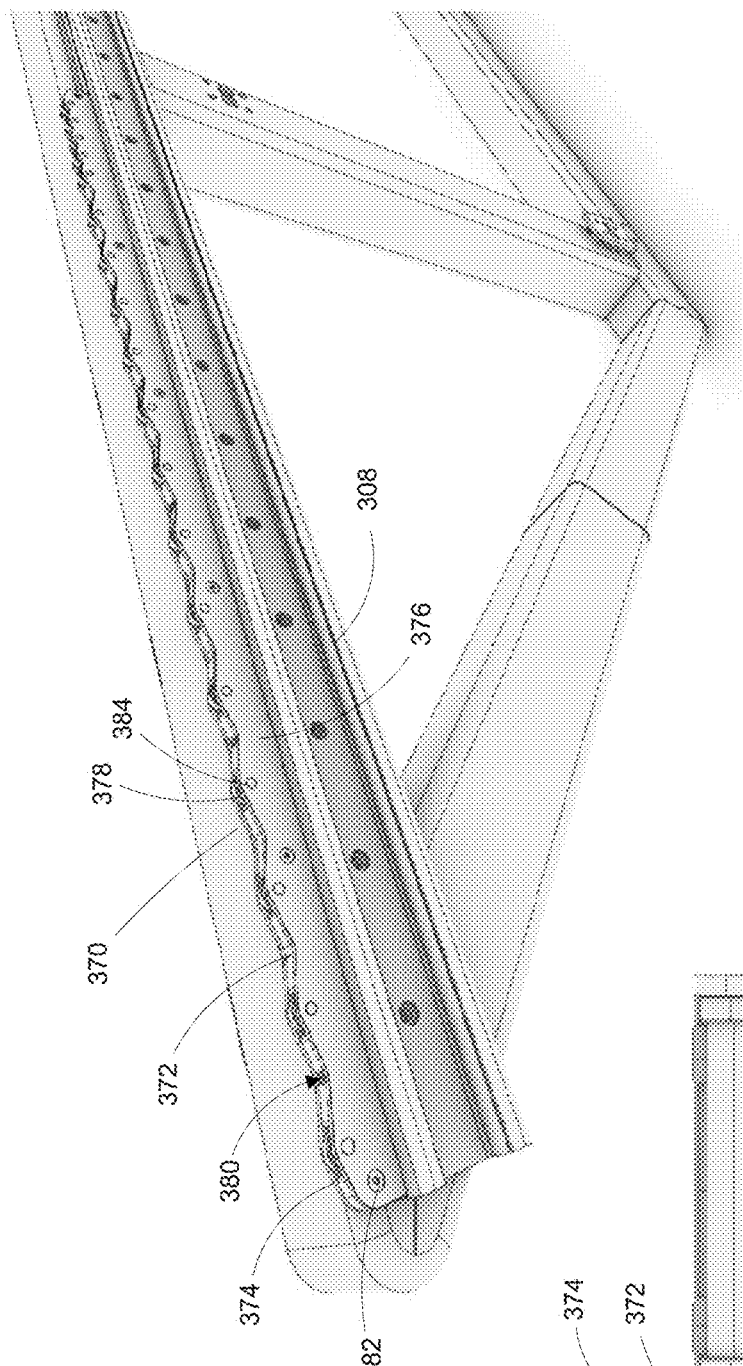
FIG. 11A is a perspective view of the bearing rail illustrating a support bearing assembly according to a representative embodiment.
Figure 11B:
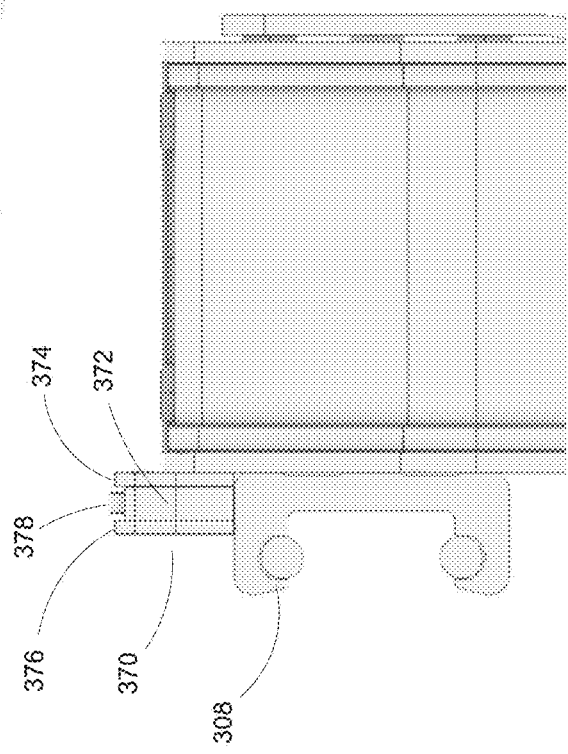
FIG. 11B is an end view illustrating the location of the support bearing assembly with respect to the bearing rail.
Figure 11C:
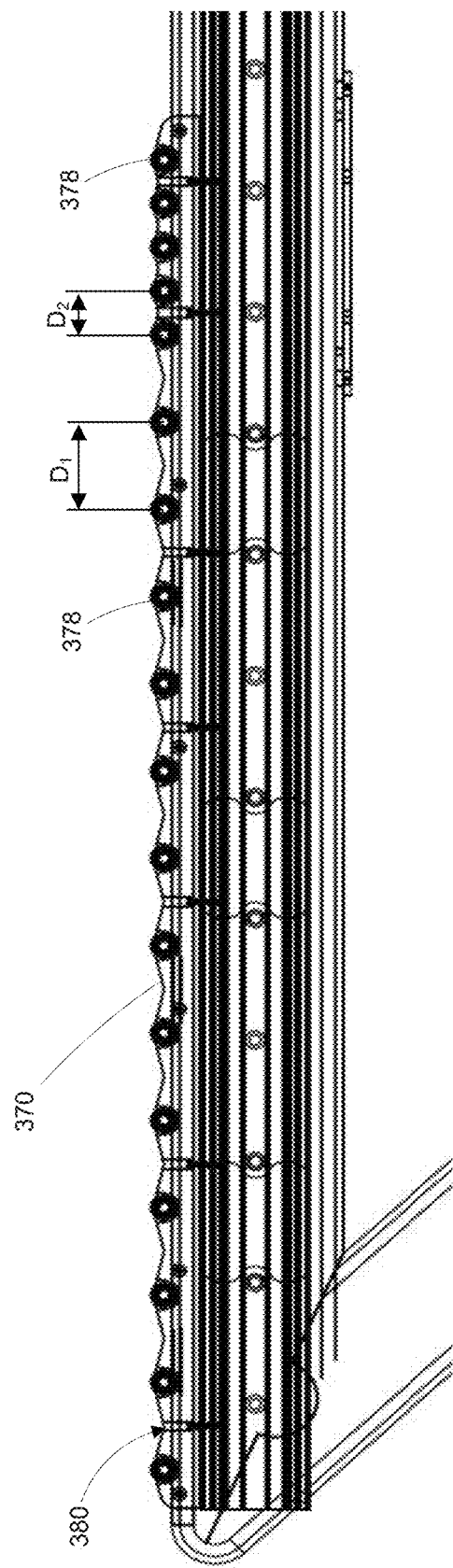
FIG. 11C is a transparent side view of the support bearing assembly shown in FIGS. 11A and 11B.

FIGS. 11A-11C illustrate a support bearing assembly 370 which in some embodiments is mounted at the end of the bearing rail 308 on the cantilever portion of the frame to help support the top hatch 306 when the hatch is in the open position. Referring briefly to FIG. 7, as the top hatch 306 moves to the open position, portions of the hatch extend onto and then beyond the cantilever portion of the frame. The support bearing assembly 370 can help support the hatch 306 as it moves to the open position. The support bearing assembly 370 can include a spacer 372 sandwiched between first and second carrier plates 374 and 376. The spacer 372 includes pockets to accommodate multiple rollers or bearings 378 along the length of the assembly. Each bearing 378 can be positioned on a corresponding bearing pin 384 that is pressed or threaded into one or more of the carrier plates 374 and 376. The assembly is fastened together with suitable fasteners such as flat head screws 382. The carrier plates 374 and 376 can comprise steel, aluminum, or other suitable material and the spacer 372 can comprise metal or plastic, such as ultra-high molecular weight polyethylene (UHMW). The spacer 372 can include multiple counterbore holes 380 for attaching the assembly to the bearing rail 308. As shown in FIG. 11C, the counterbore 380 receives a suitable fastener that can thread into the side of the bearing rail 308. In some embodiments, the bearings 378 do not have a uniform spacing. For example, in the depicted embodiment, the majority of the bearings 378 are spaced apart a distance $D_1$ and the inboard-most bearings 378 are spaced apart a distance $D_2$, which is smaller than $D_1$. The five closely spaced bearings are under constant load from the hatch 306; therefore, the smaller spacing reduces the load per bearing on these bearings as compared to the bearings which are further apart and only intermittently under load i.e., when the hatch is open or opening.

Figure 12B:
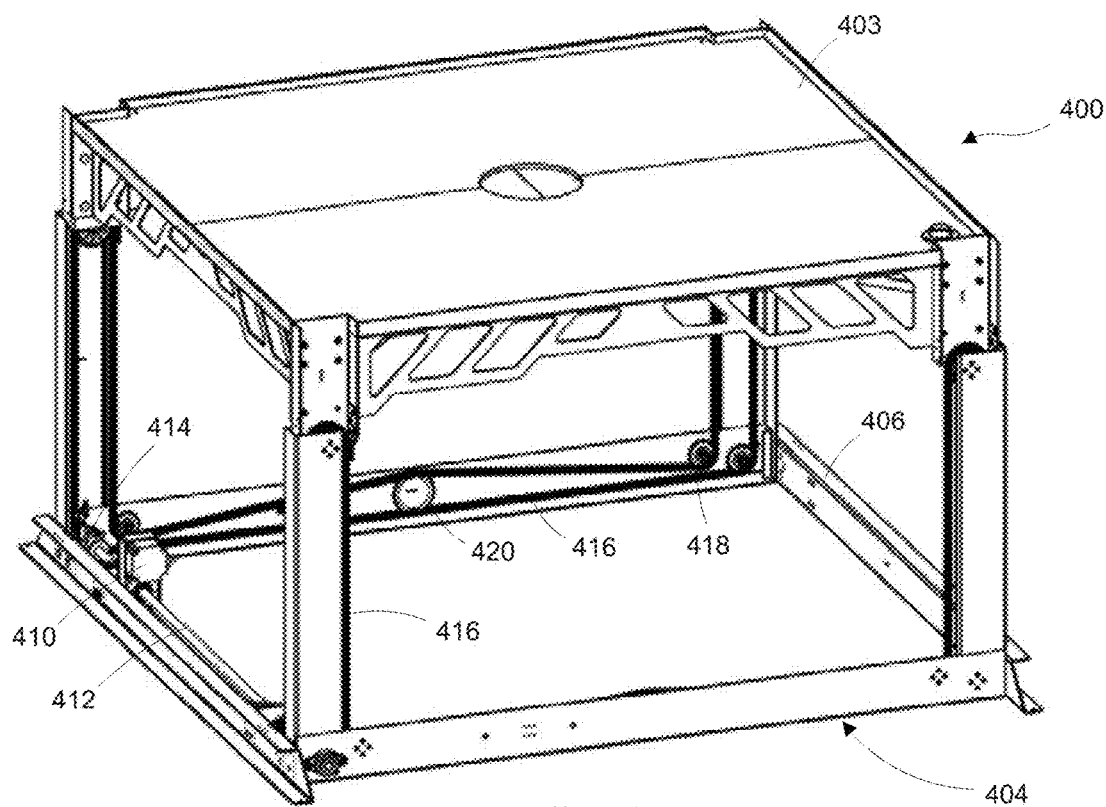
FIG. 12B is an isometric view of the vertically articulating platform in a raised position.
Figure 12A:
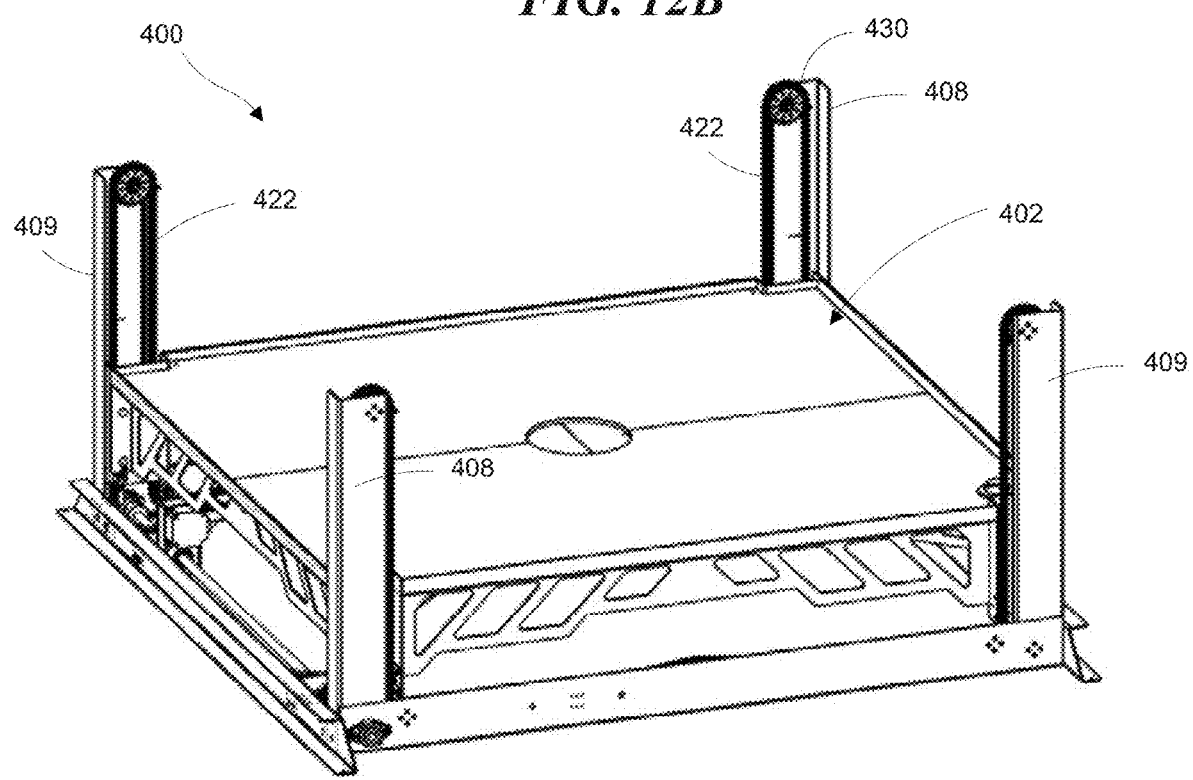
FIG. 12A is an isometric view of a vertically articulating platform in a lowered position according to a representative embodiment.

As noted above, the drone bay 316 (FIG. 7) can include a vertically articulating platform, such as platform 400 shown in FIGS. 12A and 12B, to raise a UAV from a stowed position (FIG. 12A) to a deploy or launch position (FIG. 12B). The articulating platform 400 can include a platform assembly 402 that is raised and lowered by a hoist assembly 404. The hoist assembly 404 can include a hoist frame 406 including upwardly extending vertical legs 408 and 409. The hoist frame 406 supports a chain drive mechanism comprising a gear motor 410 which drives a shaft 412 having drive sprockets 414 attached to both ends. Each drive sprocket 414 drives a chain loop 416 around various idler sprockets 418, 430, and a tensioner 420. The configuration of the chain loops and corresponding sprockets are mirror images of each other. Each chain loop 416 includes a pair of vertical loop portions 422. The platform assembly 402 is attached at its four corners to a corresponding vertical loop portion 422. Accordingly, as the chain drive mechanism moves the chain loops 416, the platform assembly 402 is raised or lowered corresponding to the direction of the drive motor 410. This hoist design provides an advantage in that the platform assembly 402 can be raised such that the landing surface 403 is well above the hoist frame legs 408 and 409 when in the raised launch position. This arrangement allows the UAV to be raised clear of the top hatch 306 (FIG. 7) for unimpeded takeoff and landing maneuvers.

Figure 13:
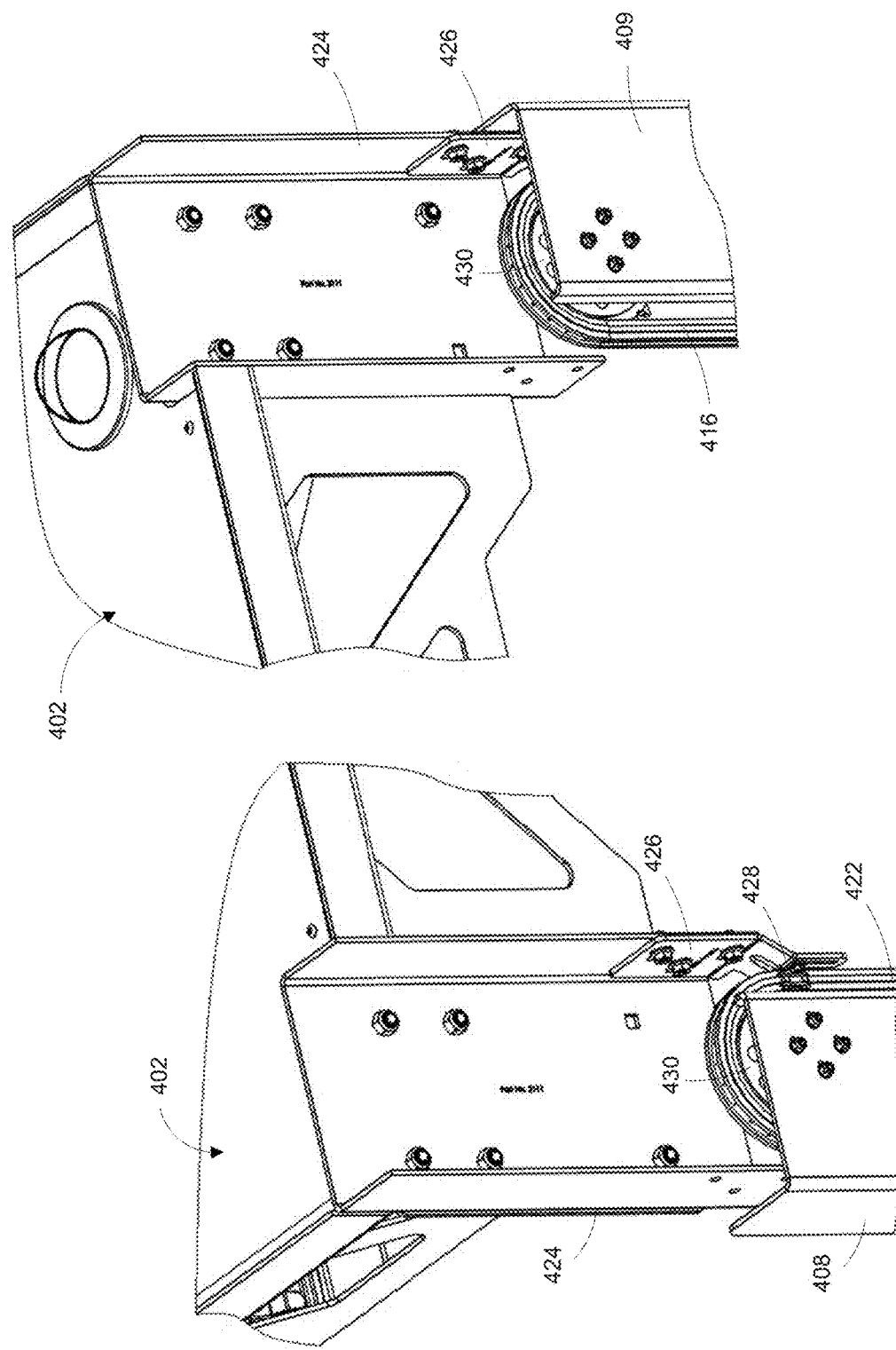
FIG. 13 is a partial isometric view illustrating portions of the chain drive.

FIG. 13 illustrates the attachment of the platform assembly 402 to the vertical loop portions 422 of the chain loops 416. The platform assembly 402 includes corner channels 424 that attach to the chain loops 416 via adjustment brackets 426 and chain link connectors 428. The adjustment brackets 426 include horizontal and vertical slots to facilitate positioning and leveling the platform. As can be appreciated in the figure, for a given chain loop 416, the corner channels 424 are connected to the same side of the sprockets 430 (i.e., the right side as oriented in FIG. 13) to account for the chain being a loop.

Figure 14:
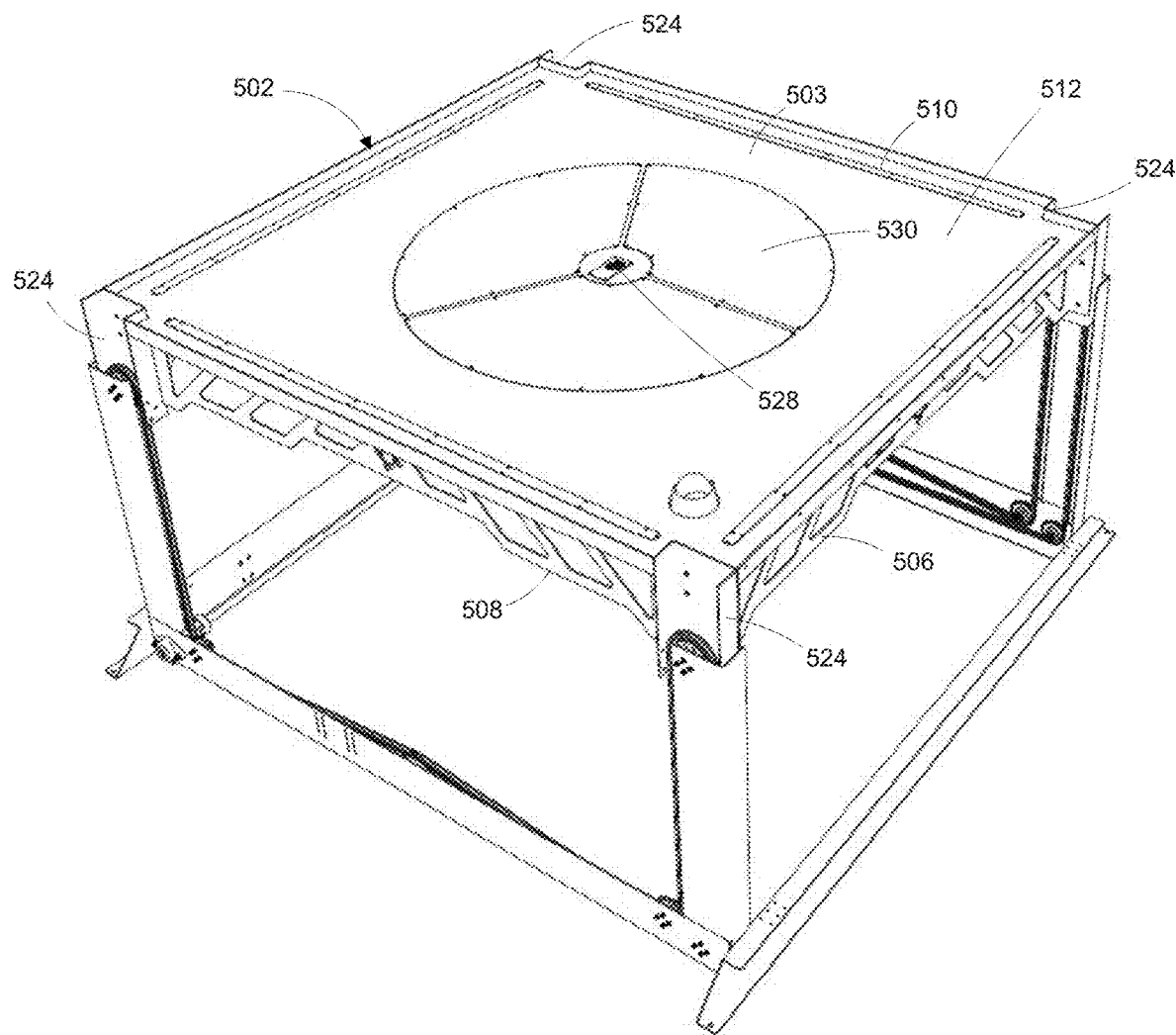
FIG. 14 is a perspective view of a vertically articulating platform illustrating a landing pad according to a representative embodiment.
Figure 15:
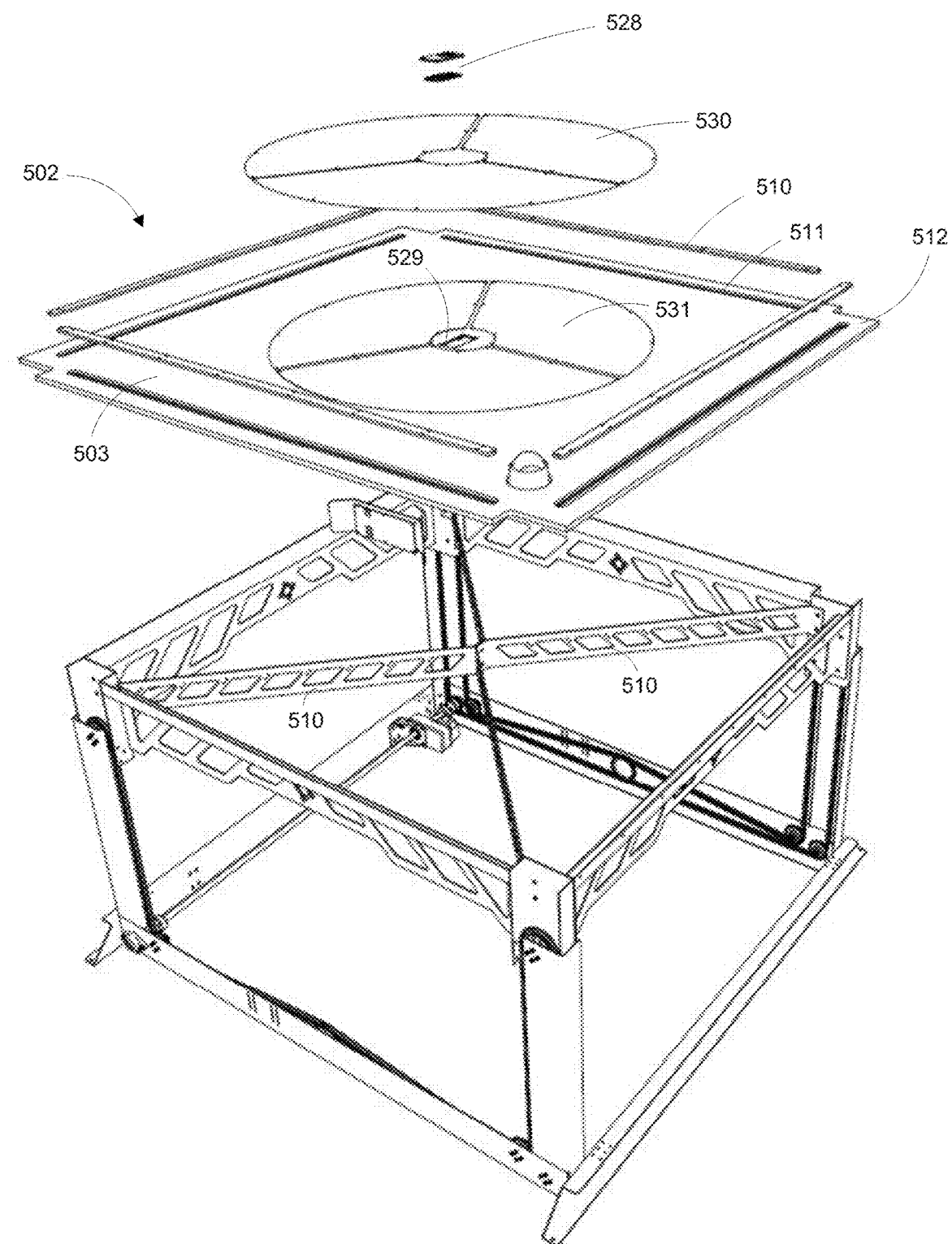
FIG. 15 is an exploded perspective view of the landing pad shown in FIG. 14.

FIGS. 14 and 15 illustrate a platform assembly 502 according to another representative embodiment. The platform assembly 502 is similar to that described above with respect to FIGS. 12A-13. The platform assembly 502 also includes charging pads 530 and a landing beacon 528. The platform assembly 502 includes surrounding frame members 508 extending between the corner channels 524. The corner channels can attach to the hoist assembly in a similar manner to that described above with respect to FIG. 13. The frame members 508 support a landing pad 512. The platform assembly 502 can include light strips 510 (e.g., LEDs) along the edges of the landing pad 512 to indicate status. The charging pads 530 and landing beacon 528 are countersunk into the landing pad 512 such that the surface of the charging pads 530 and beacon 528 are flush with the landing surface 503. The charging pads 530 are arranged on the landing pad 512 such that contacts (e.g., spring loaded contact pins) located on opposite corners of a UAV will contact two of the three pads for charging the UAV. The spacing between the pads is selected to reduce the possibility that a single contact will come into contact with two pads at one time, while simultaneously providing a high probability of good contact based on random landing locations of the UAV. In some embodiments, charging circuitry automatically connects the charging pads to a charging power supply to send the correct polarity, correct current, and correct voltage to the UAV through the charging pads. In some embodiments, the charging pads 530 can comprise soda blasted copper sheeting. Soda blasting the copper sheeting reduces the reflectivity of the charging pads 530 to help prevent interfering with the landing beacon and the UAVs automated landing process. In some embodiments, the charging pads are designed to be swappable in the field using one tool.

With reference to FIG. 15, the platform assembly 502 can include cross braces 510 attached to the corner braces to further support the landing pad 512. The landing pad 512 is comprised of UV stable 0.5 inch thick plastic and includes pockets 511, 529, and 531 to accommodate the light strips 510, beacon 528, and charging pads 530, respectively.

Although the disclosed drone ports are described with respect to ports that are co-located with emergency facilities (e.g., fire station, police station, hospital or dispatch), the disclosed technology can be scaled for other locations. For example, the disclosed drone ports can be sized and adapted to fit in the bed of a truck or the roof of a vehicle. In some implementations, the drone ports can be sized to fit on a desk, for example. In other implementations, the ports can be sized and adapted to fit on a back pack for transport to remote locations.

In a representative operating scenario, an emergency call comes into a dispatch center reporting a structure fire. The dispatcher can deploy the drone with a button or command on their computer screen. Alternatively, the dispatcher presses a dedicated physical launch button. Once the launch command is initiated, the location of the structure fire is transmitted to the drone and the top hatch of the drone port retracts to allow the drone to take off. The various warning and indication lights can be activated as well as appropriate audible alarms to notify any people in the area that the drone is about to take off. The drone can fly to the location of the structure fire and transmit data including images, sound, and/or a video feed, for example, to the first responders as they depart or are in route to the fire. The video feed, for example, can then be distributed via a network to various devices, such as police/fire laptops, mobile hand-held devices, and one or more command centers, such as a police dispatch or command station and/or a fire and rescue command station. In some embodiments, the drone can communicate directly with the network via a wireless connection. In some embodiments, the network can comprise the FirstNet PS-LTE broadband network (e.g., a portion of the Band 14 spectrum). The FirstNet PS-LTE broadband network, established by the National Telecommunications and Information Administration (NTIA), provides first responders with a high-speed, broadband network dedicated to public safety. In some embodiments, camera data is transmitted on a 5 GHz channel, control data is transmitted on a 2.4 GHz channel, and telemetry data is transmitted on a 900 MHz channel.

When the drone is initially deployed, the top hatch can remain open or closed in order to protect the interior from weather and/or debris. Once the drone has completed its mission, it autonomously returns to the drone port and lands in the drone bay. If the hatch was closed after takeoff the drone can transmit a signal to the port to command the hatch to open as the drone arrives. Once the drone is back in the port it can be charged via the charging platform and readied for the next deployment.

Although specific embodiments have been shown by way of example in the drawings and are described in detail above, other embodiments are possible. For example, in some embodiments, an aerial vehicle port can include a container having a base frame. The base frame can include at least one cantilever portion. A hatch is carried by the base frame and is horizontally movable relative to the container between an open position and a closed position. The hatch can include a hatch frame and a radio frequency transparent covering attached to the hatch frame. The covering can include an inner layer, a foam core, and an outer layer. A platform can be positioned in an interior of the container, which is vertically movable between an aerial vehicle stowed position and an aerial vehicle deploy position.

In some embodiments the covering includes a plurality of plugs positioned in corresponding apertures in the foam core, and wherein the covering is attached to the hatch frame with a plurality of fasteners, each of said fasteners extending through the inner layer and threaded into a corresponding one of the plurality of plugs. In some embodiments, the plurality of plugs and the plurality of fasteners comprise plastic. In some embodiments, the inner layer and the outer layer comprise polycarbonate sheet and the foam core comprises a radio frequency transparent material. In some embodiments, the radio frequency transparent material is flexible polyurethane foam. In some embodiments, the hatch frame comprises a plurality of ribs, each said rib including one or more tabs for mounting the covering; the covering includes a plurality of plugs positioned in corresponding apertures in the foam core, and wherein the covering is attached to the hatch frame with a plurality of fasteners, each of said fasteners extending through a corresponding tab and the inner layer, and threaded into a corresponding one of the plurality of plugs; and wherein the inner layer and the outer layer each comprise polycarbonate sheet and the foam core comprises a radio frequency transparent flexible polyurethane foam. In some embodiments, the platform includes an infrared emitter positioned on the platform and operable to help guide an approaching aerial vehicle for automated landing on the platform when in the deploy position. In some embodiments, the platform is carried by an automated mechanism operative to raise and lower the platform between the stowed and deploy positions. In some embodiments, the hatch is automatically operated with an actuator and an associated drive system.

In another representative embodiment, an aerial vehicle port can include a container having a base frame, said base frame including at least one cantilever portion. A hatch can be carried by the base frame, said hatch being horizontally movable relative to the container between an open position and a closed position, wherein the at least one cantilever portion is positioned to support the hatch when in the open position. A vertically articulating platform can be positioned in an interior of the container. The platform can include a platform assembly and a hoist assembly. The hoist assembly can include a hoist frame having upwardly extending legs and a chain drive mechanism carried by the hoist frame and coupled to the platform assembly whereby said platform assembly is vertically movable between an aerial vehicle stowed position and an aerial vehicle deploy position, wherein a landing surface of the platform assembly is above the hatch in the deploy position.

In some embodiments, the chain drive mechanism includes a pair of chain loops each having a pair of vertical loop portions extending along a corresponding upwardly extending leg of the hoist frame. In some embodiments, the platform assembly is coupled to the vertical loop portions. In some embodiments, the hatch is automatically operated with an actuator and an associated drive system. In some embodiments, the hatch includes a hatch frame enclosed with a covering. In some embodiments, the covering comprises a foam core.

In another representative embodiment, an aerial vehicle port can include a container having a base frame, said base frame including two cantilever portions. A hatch can be carried by the base frame, said hatch including rollers positioned on opposite sides of the hatch and engaging corresponding bearing rails mounted to the base frame, whereby the hatch is horizontally moveable relative to the container between an open position and a closed position, wherein the cantilever portions are positioned to support the hatch when in the open position. A pair of support bearing assemblies, each extend along at least a portion of a corresponding one of the cantilever portions and are mounted to a corresponding bearing rail. A platform can be positioned in an interior of the container, said platform being vertically movable between an aerial vehicle stowed position and an aerial vehicle deploy position.

In some embodiments, the support bearing assemblies are each comprised of a spacer sandwiched between first and second carrier plates, wherein the spacer includes a plurality of pockets to accommodate a plurality of corresponding bearings carried by the first and second carrier plates. In some embodiments, the plurality of corresponding bearings comprises a first plurality of bearings spaced apart a first distance, and a second plurality of bearings spaced apart a second distance less than the first distance. In some embodiments, the platform is carried by an automated mechanism operative to raise and lower the platform. In some embodiments, the roof includes a roof frame having a plurality of trusses enclosed with a covering. In some embodiments, the roof is automatically operated with an actuator and an associated drive system.

Recharging System

Figure 16:
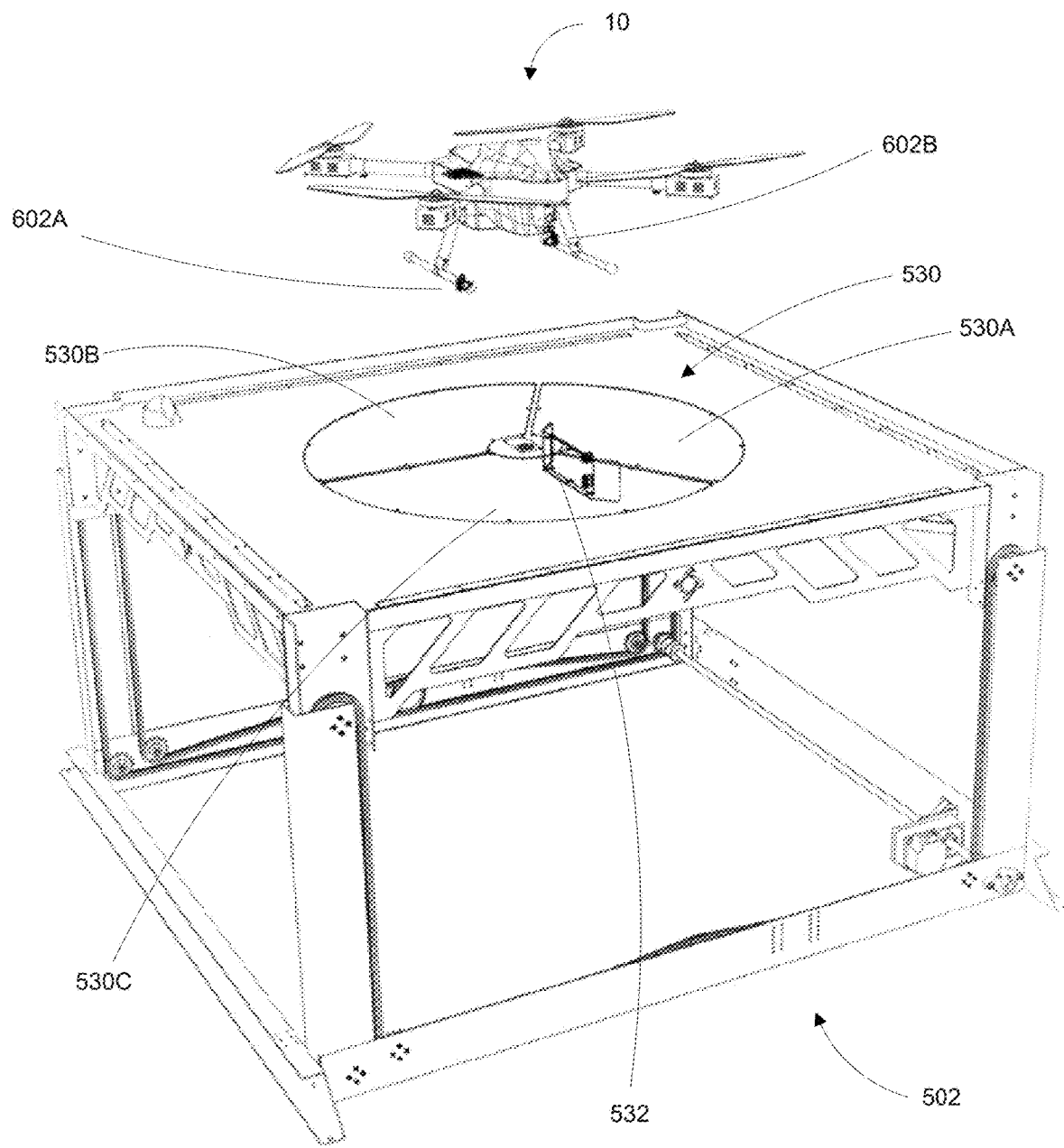
FIG. 16 is a perspective view of at least a portion of a recharging station, and illustrates an unmanned aerial vehicle approaching a landing platform of the recharging station.

FIG. 16 is a perspective view of the UAV 10 and platform assembly 502. Platform assembly 502 is similar to the platform assembly 502 in FIGS. 14 and 15 and UAV 10 is similar to the UAV 10 shown in FIG. 2 but includes polarized contacts 602A and 602B. For the purposes of this discussion, platform assembly 502 is configured as a recharging station. The platform assembly 502 can be a standalone assembly, it can be part of a port such as port 100 in FIG. 1, or a retrofit to an existing landing platform or port. Generally, the platform assembly 502 can serve as a place for UAV 10 to land and be recharged.

It should be appreciated from the description to follow that some or all components which allow for recharging of the UAV can be used to retrofit an existing drone port which otherwise does not have recharging capabilities. Alternatively, suitable components could be integrated into a drone port during the initial manufacture and assembly. Importantly, it is desirable to have the drone port bear as much of the weight as possible when it comes to the various recharging components described herein so that as little weight as possible is carried by the UAV itself.

In order for the UAV 10 to be recharged, an electrical connection between the UAV 10 and platform assembly 502 is required. One way to establish such an electrically connection is to align the polarity of the polarized contacts 602A-B on UAV 10 with the polarity of the particular charging pads 530A-C on which the UAV 10 lands and makes contact. The polarity of the polarized contacts 602A and 602B refers to the electrical polarity of the respective contact. In other words, each polarized contact 602A-B is configured to have a positive or negative electrical potential as a result of its interconnection to the UAV's onboard rechargeable battery (not shown). Based on the polarity of each polarized contact 602A-B in relation to a charging pad 530A-C, electrical energy can flow through the contact into the UAV 10 and more specifically, into the onboard rechargeable battery to recharge the UAV 10 and ready it for another mission. Further, to ensure optimal electrical energy transfer, the polarized contact 602A-B can be made of a suitable conductive material such as copper.

In some embodiments, the configuration of each polarized contact 602A-B can depend on the internal wiring of the UAV 10. However, it is important to note that the polarized contacts 602A-B should be oppositely polarized. For example, the UAV's rechargeable battery can be connected to the polarized contacts 602A-B wherein, for example, the positive connection from the rechargeable battery can be connected to polarized contact 602A, while the negative connection is connected to polarized contact 602B.

The polarized contacts 602A-B can be coupled to portions of the UAV 10. In FIG. 16, each polarized contact 602A-B is coupled to an associated landing skid of the UAV 10. Further, each polarized contact 602A-B is preferably coupled to the landing skids on opposite sides. However, other configurations are possible to ensure contact with the charging pads 530A-C. In some embodiments, only the polarized contacts 602A-B can physically contact the charging pads 530A-C. Thus, the polarized contacts 602A-B can be located on the skids such that the weight of the UAV 10 is equally distributed between each contact. Alternatively, if the polarized contacts 602A-B are on the same skid, the UAV 10 can be unbalanced since the weight would not be substantially evenly distributed between them.

Another consideration for determining the configurations of the polarized contacts 602A-B is the configuration of the charging pads 530A-C. Given that each polarized contact 602A-B has a different polarity to enable charging of a rechargeable battery, the configuration should preferably ensure that the polarized contacts 602A-B do not contact the same charging pad 530A-C at any given time. Thus, the location on UAV 10 to which the polarized contacts 602A-B are coupled can be related to the size of each charging pad 530A-C to ensure proper electrical connection.

In addition to the components on UAV 10, FIG. 16 depicts platform assembly 502 including a charge sensor 532 in addition to the multiple charging pads (or conductive regions) 530A-C. Charge sensor 532 is preferably mounted underneath the landing platform and is, therefore, illustrated in phantom. Charging pads 530A-C and associated circuitry described in more detail below are interfaced between the polarized contacts 602A-B, and a power supply associated with the recharging station to appropriately electrically couple the power supply to the UAV's onboard battery so it can be recharged. To this end, the power supply can be an AC to DC power supply which draws AC power from a breaker. For example, the power supply can supply up to 750 Watts of power at up to a 1-C rate, although other configurations are certainly possible.

In some embodiments, the charging pads 530A-C can be removably coupled to the platform assembly 502. For instance, the charging pads 530A-C can be weighted such that the charging pads 530A-C can be immovably situated on a landing surface of platform assembly 502. In some embodiments, the charging pads 530A-C can be adapted to be coupled to the platform assembly 502 using suitable coupling mechanisms such as bolts, clamps, and/or adhesives. Once disposed on or connected to the platform assembly 502, the electrical connections can be made.

Figure 17:
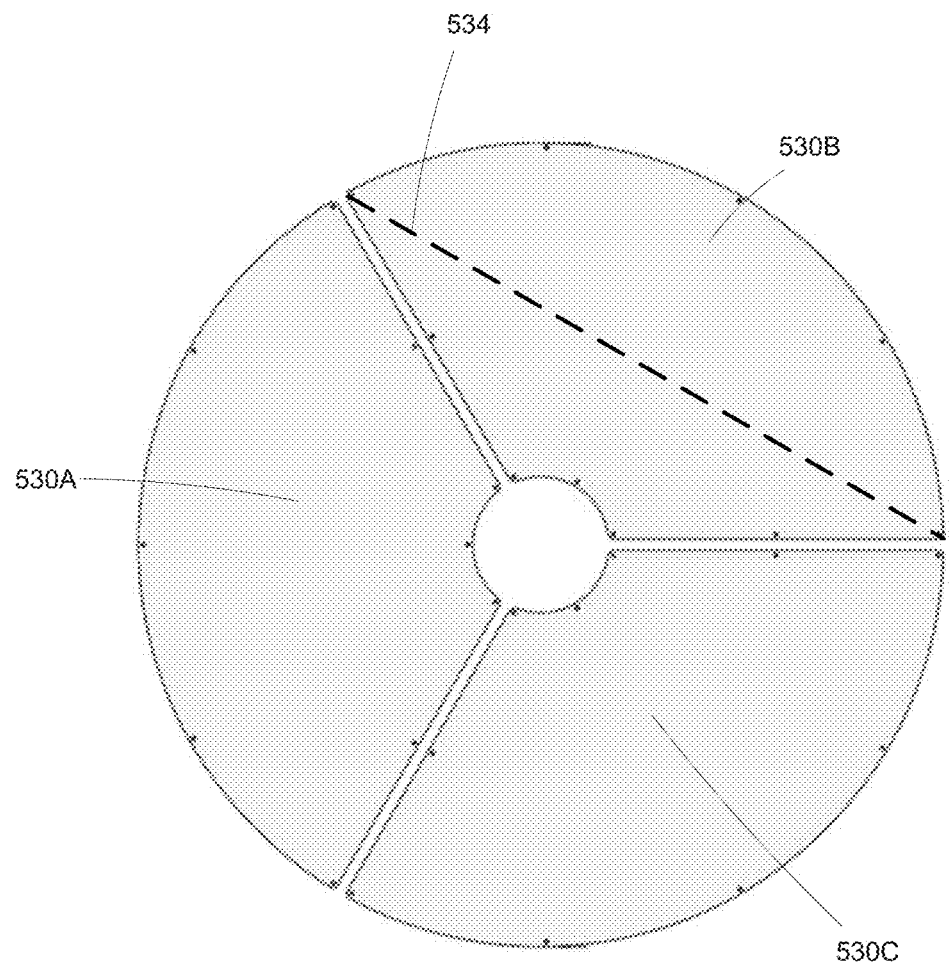
FIG. 17 is top-down view of multiple charging regions which may be disposed on the landing platform.

FIG. 17 is top-down view of the charging regions. The charging regions preferably comprise three charging pads, as shown, which are preferably of like construction. As mentioned above, the charging pads 530A-C can be configured such that the contacts (polarized contacts 602A-B in FIG. 16) from UAV 10 do not land on the same charging pad at any given time. One way to ensure such a configuration, for example, is to have the charging pads 530A-C be arranged in a discoidal manner and equiangularly distributed. Additionally, the charging pads 530A-C can be configured such that the largest dimension of each pad, for example length 534 in FIG. 17, is less than the linear distance between polarized contacts 602A-B. So, if the linear distance between the polarized contacts 602A-B is 20 inches the largest dimension 534 of each charging pad is preferably less than 20 inches (e.g., 19 inches). Further, in some embodiments, the charging pads 530A-C can be arranged such that each charging pad 530A-C is not in physical contact with another charging pad 530A-C. For example, a 1 inch gap can separate the charging pads 530A-C. Thus, to ensure that the polarized contacts 602A-B contact different charging pads 530A-C, the size of the gap can also be accounted for.

Figure 18:
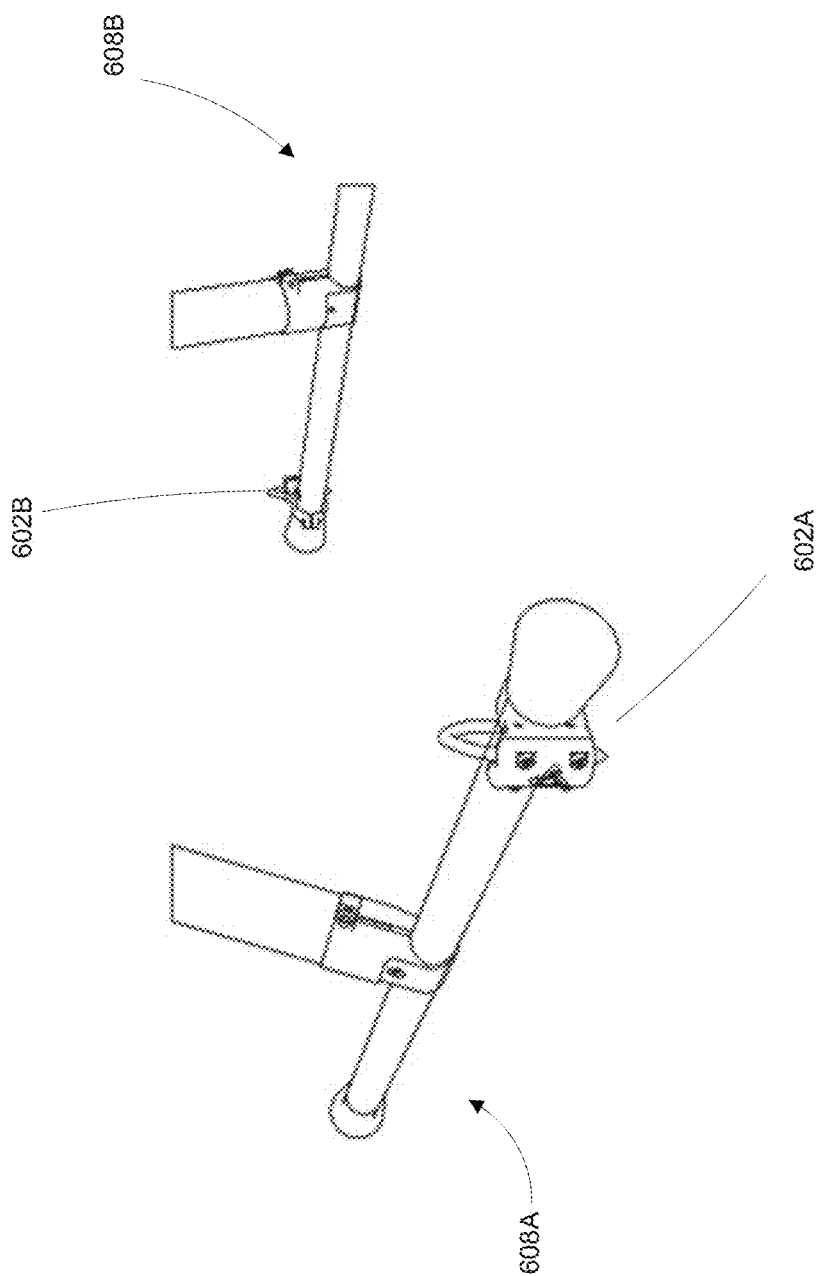
FIG. 18 is a close-up perspective view of polarized contacts coupled with portions of an unmanned aerial vehicle.

FIG. 18 is an enlarged view of polarized contacts 602A-B coupled to the skids 608A-B, respectively, of a UAV. In some embodiments, the polarized contacts 602A-B are permanently coupled to the skids 608A-B, respectively. For example, the polarized contacts 602A-B can be welded to the skids 608A-B. Alternatively, the polarized contacts 602A-B can be removably coupled to the skids 608A-B. For example, polarized contacts 602A-B can be clamped or bolted onto the skids 608A-B using attachment mechanisms.

In some embodiments, the skids 608A-B can be configured as a housing for internal wiring (not shown) that connects a rechargeable battery on board the UAV to the polarized contacts 602A-B. For example, skid 608A can house wiring which connects the positive terminal of a rechargeable battery to the polarized contact 602A and skid 608B can house wiring which connects the negative terminal of the rechargeable battery to the polarized contact 602B. Suitable conductivity, low weight and corrosion resistance are important considerations in the design and selection of materials for the polarized contacts. To this end, they are preferably configured as a pogo pin and comprised of tellurium copper.

Figure 19:
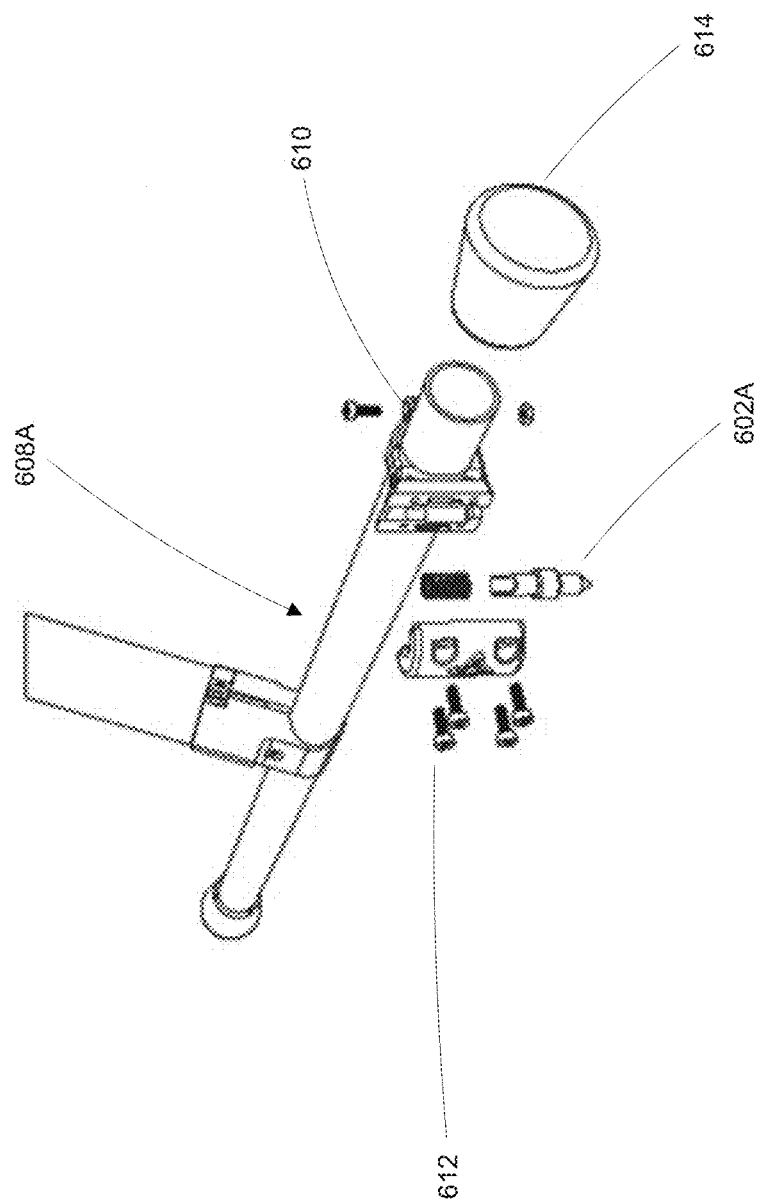
FIG. 19 exploded perspective view of a representative polarized contact.

FIG. 19 is an exploded view of a representative polarized contact 602A which incorporates a clamp 610, a cover 612, and end 614. As mentioned in conjunction with FIG. 18, the polarized contact 602A can be removably coupled to the skid 608A. Here, in FIG. 19, for example, the polarized contact 602A is removably coupled using a combination of screw-based tightening mechanisms. The clamp 610 is secured to the skid 608A by tightening the corresponding screw. For example, a user can remove the end 614, slide clamp 610 onto the skid, and tighten a corresponding screw to ensure that clamp is securely fastened against the skid 608A.

The polarized contact 602A can be secured against the clamp 610. The clamp 610 can include a portion to receive the polarized contact 602A and the cover 612. For example, a user can place the polarized contact 602A within an opening of clamp 610, then secure cover 612 against clamp 10, and tighten the corresponding screws such that the polarized contact 602A is secured in place. The placement of the polarized contact 602A within the opening of clamp 610 can be such that a portion of the polarized contact 602A protrudes downwardly beyond the bottom of the skid 608A and clamp 610. By doing so, the portion that protrudes out can contact a charging pad when the UAV lands.

In some embodiments, clamp 610 can be placed over a hole on the skid such that the internal wiring (not shown) can be substantially concealed yet accessible. For example, the internal wiring can be pulled through the hole on the skid, then through a corresponding hole on the clamp 610, and placed in contact with the polarized contact 602A. In this example, the polarized contact 602A can include an input location which can receive the wire and secure the wire in place. In another example, a portion of the skid 608A can be connected to the internal wiring. The clamp 610 can be placed over the portion to allow the polarized contact 602A to be secured against the portion when cover 612 is tightened. In yet another example, the polarized contact 602A can include a crimping mechanism that crimps a wire against the polarized contact 602A. In yet another example, polarized contact 602A can, first, be inserted into a spring. Subsequently, the internal wiring can be soldered with the polarized contact 602A and/or the spring. The point of contact between the internal wiring, and the polarized contact 602A and/or the spring can be controlled by a strain relief that is built into the internal wiring. Those skilled in the art will recognize that there are numerous other ways to provide polarity to the polarized contact 602A, so that the various approaches described herein are only representative.

Figure 20:
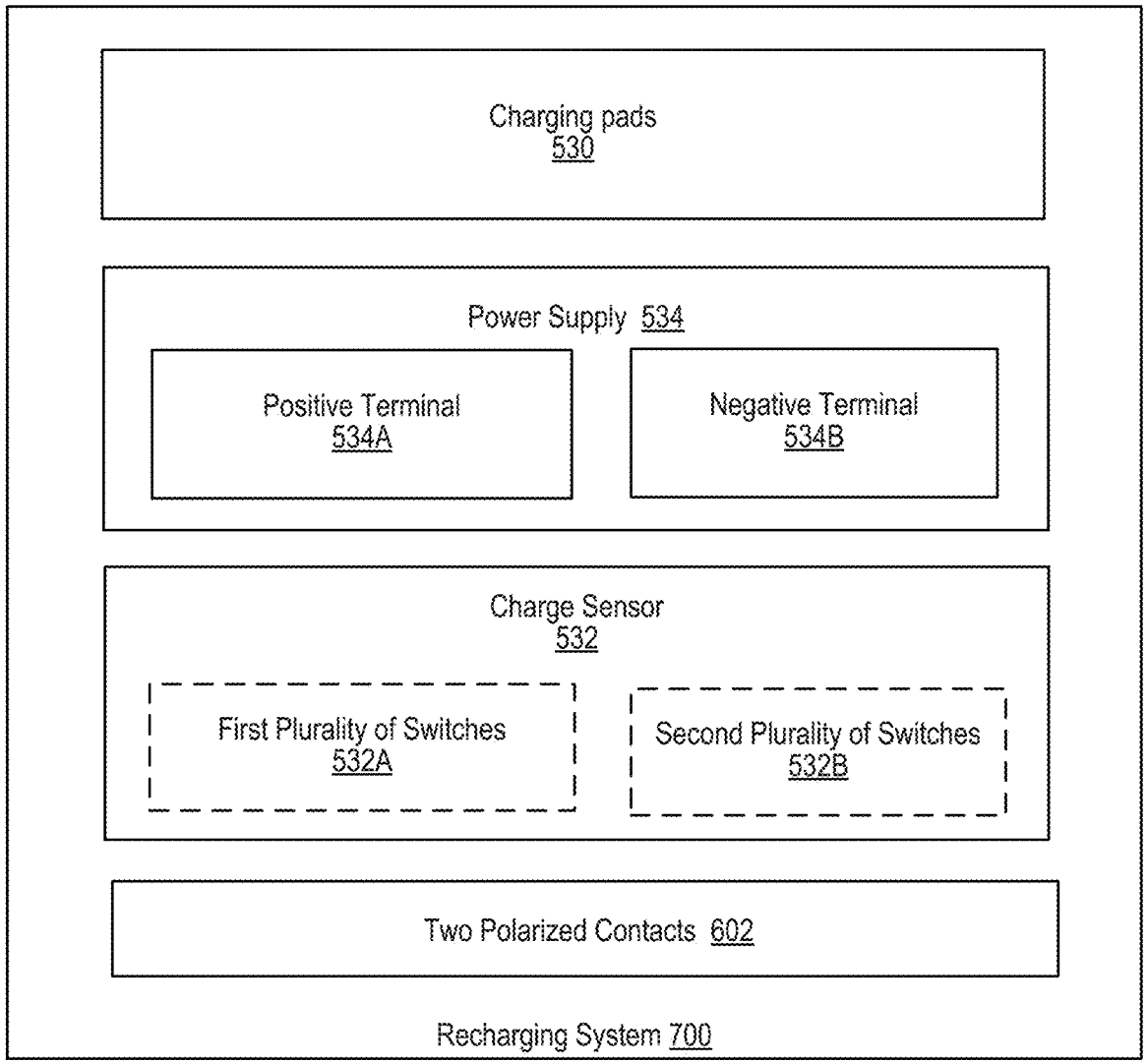
FIG. 20 is a functional block diagram of an exemplary recharging station that can be utilized to recharge an unmanned aerial vehicle.

FIG. 20 is a functional block diagram of an example recharging system 700 that can be utilized to recharge a UAV. The recharging system 700 can include the charging pads (or conductive regions) 530, power supply 534, charge sensor 532, and polarized contacts 602. As mentioned above, each of the components of the recharging system 700 can be permanently or removably coupled to the recharging station such that the components can be retrofitted into an existing drone port or integrated into a drone port during manufacturing. To this end also, it should be appreciated that the recharging station can be constructed as described earlier in FIGS. 1-15 and incorporate one or more of the features discussed in connection with those figures. For example, the recharging station can include an infrared emitter, as in infrared emitter 228 in FIG. 5, configured to guide an aerial vehicle onto the charging pads 530. Additionally, the recharging station can include an automated mechanism configured to raise and lower the charging pads 530 between a stowed position and a deployed position. Recharging station can also include a hatch that covers a top of the charging pads 530 when closed and is configured to move between an open position and the closed position. Optionally also, the recharging station can include a communications module for establishing a communication channel with an UAV. In addition to communicating with the UAV, the communications module can also establish a communication channel with a remote base station or hub. In some embodiments, the communications module can send an error message to a remote base station and/or other systems over the established communication channel. For example, the communications module can send an error message when a UAV has landed on the recharging system but a residual voltage is not detected. Additionally, the communication system can relay information to the base station such as video and/or audio feeds, status of the battery, and/or status of other components of the drone.

Figure 21:
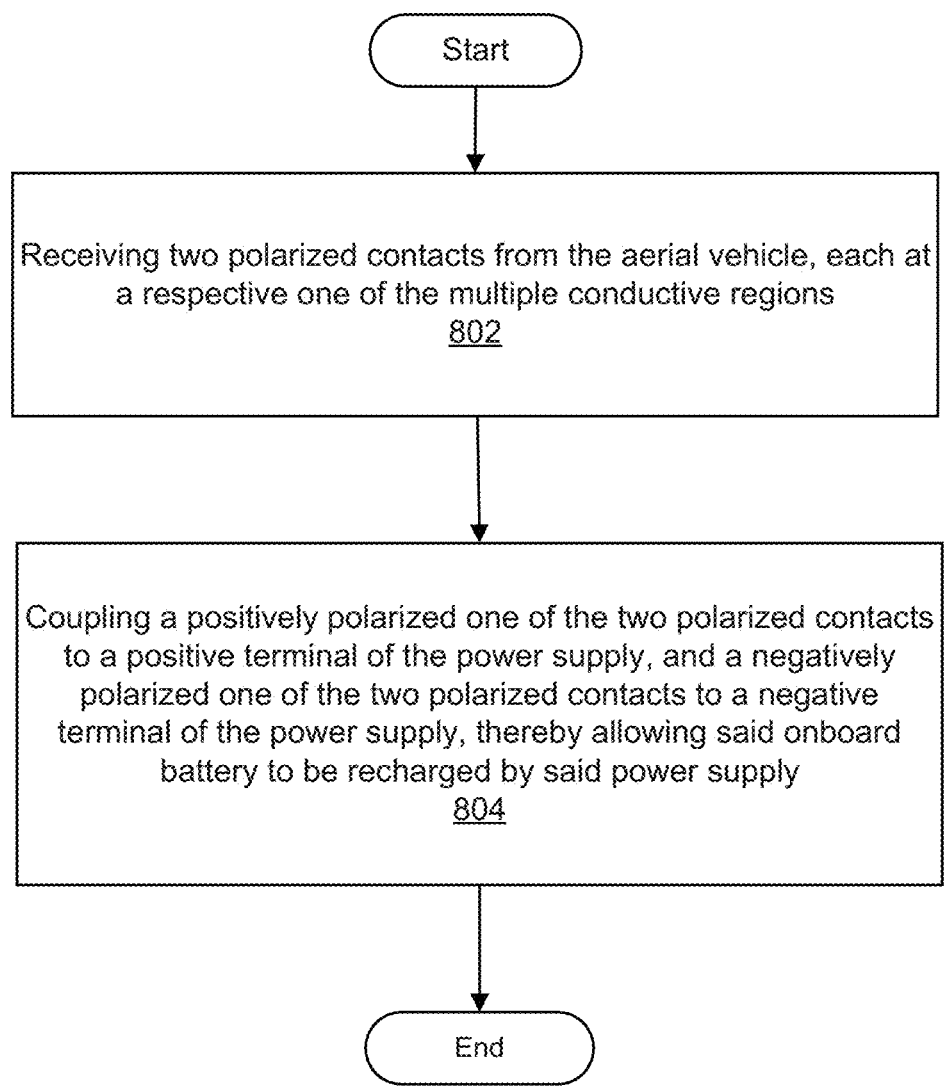
FIG. 21 illustrates a flowchart of an exemplary method for recharging an onboard battery of an unmanned aerial vehicle.

FIG. 21 shows a flowchart of an exemplary method for recharging an onboard battery of an UAV via, for example, the recharging system 700 in FIG. 20. At block 802, the two polarized contacts are received (e.g., polarized contacts 602) from an aerial vehicle (or UAV), each at a respective one of the multiple conductive regions (e.g., charging pads 530). At block 804, the positively polarized one of the two polarized contacts is coupled to a positive terminal of the power supply, and a negatively polarized one of the two polarized contacts is coupled to a negative terminal of the power supply, thereby allowing an onboard battery of the UAV to be recharged by said power supply.

Figure 22:
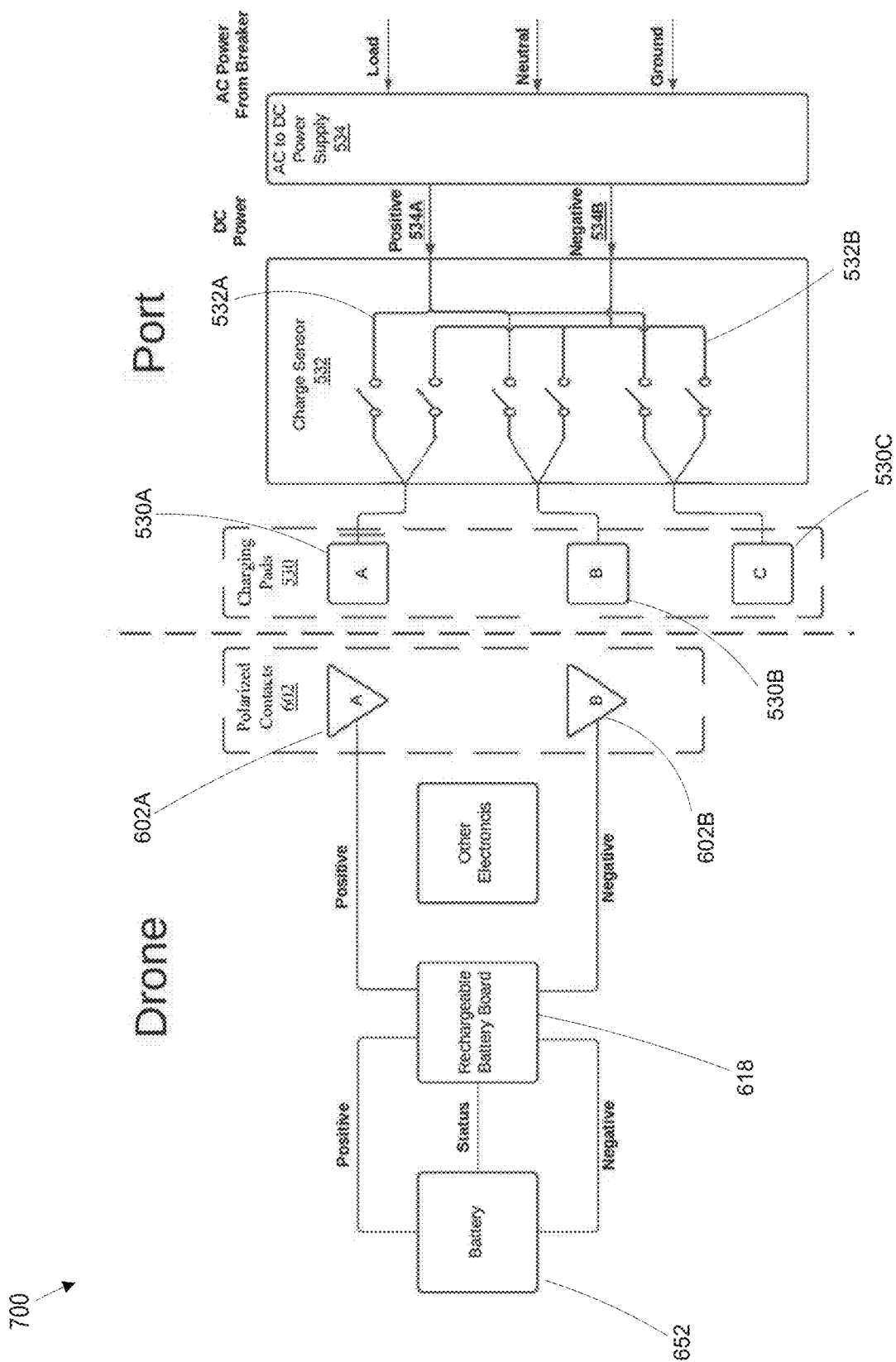
FIG. 22 is a diagrammatic representation of an exemplary embodiment of a recharging system.

FIG. 22 is a circuit diagram of a recharging system 700 and certain components of the drone (e.g. UAV 10). Recharging system 700 may include one or more components on the port (e.g., platform assembly 502) and one or more components of UAV 10. Aside from the components shown, the UAV may also include other electronics conventionally found in drones, such as a flight management system, camera system, etc., collision avoidance system, a communications system to establish communication channels with remote devices and/or systems, etc., all as well known in the art.

The port side may include AC to DC power supply 534, charge sensor 532, and charging pads 530. The drone side may include polarized contacts 602, and rechargeable battery board 618 that includes a battery management system, which is described in greater detail below with reference to FIGS. 23A-B. In general, as depicted by the arrows, the power supply 534 can supply power to the charging pads 530A-C via the charge sensor 532. The charge sensor 532 operates switches 532A-B that are connected to the charging pads 530A-C to provide the required polarity to a charging pad 530A-C.

Each charging pad 530A-C can be connected to the power supply 534 such that the polarity of each charging pad 530A-C can be changed based on the polarity of the polarized contact 602A-B that the charging pad 530A-C connects with. Further, each charging pad 530A-C can be connected to the charge sensor 532. The charge sensor 532 can be located underneath the top surface of the port (or platform assembly 502). The charge sensor 532, in general, can operate the switches 532A-B between the charging pads 530A-C and the power supply 534, based on the polarity of the polarized contacts 602A-B.

The charge sensor 532 can include memory and a processor capable of executing instructions stored in the memory. For example, the charge sensor 532 can include a microcontroller such as an Arduino Nano 33 IoT. The microcontroller can also include on board memory such as flash memory. Thus, instructions can be uploaded during, for example, manufacturing, which instruct the microcontroller on how to control the switches 532A and 532B.

For example, each charging pad 530A-C can be connectable via a first set of switches 532A or a second set of switches 532B to either the positive terminal 534A or the negative terminal 534B of power supply 534. More particularly, the switches 532A-B (e.g., mosfets) can be connected in parallel. For example, as shown in FIG. 22, each set of switches 532A-B can include three switches. The first plurality of switches 532A can each be interconnected between the positive terminal 534A and one of the charging pads 530A-C. The second plurality of switches 532B can each be interconnected between the negative terminal 534B and one of the charging pads 530A-C. The charge sensor 532, in order to electrically couple a terminal 534A-B to a corresponding polarized contact 602A-B, can actuate (e.g., close or open) one or more of the switches 532A-B so that the positive terminal 534A is electrically coupled to the positively polarized contact 602A-B and the negative terminal 534B is electrically coupled to the negatively polarized contact 602A-B.

For example, assume the switches 532A-B are initially in an open position as depicted in FIG. 22. Assume also that first charging pad 530A receives a positively polarized contact 602A, when the UAV lands, while a second charging pad 530B receives a negatively polarized contact 602B. In one embodiment, the polarized contacts 602A-B provide a polarized residual voltage from the rechargeable battery board 618 of the UAV, which the charge sensor 532 can receive and use to determine the polarity of the polarized contacts 602A-B. Upon detecting the polarity configuration, the charge sensor 532 can close an appropriate first switch 532A to electrically couple first pad 530A to the power supply's positive terminal 534A. Similarly, charge sensor 532 can close an appropriate second switch 532B to electrically couple second pad 530B to the power supply's negative terminal 534B. The other switches would preferably remain in the open state.

The ordinarily skilled artisan would appreciate that the charge sensor 532 can include instructions stored in flash memory of the microcontroller to toggle the appropriate switches based on their existing state, and which charging pads are involved, in order to ensure correct coupling between the charging pads and the power supply. In a preferred embodiment, all of the switches could be reset to a default normally open state once recharging is complete and the charge sensor would know this configuration prior to the next UAV landing. Alternatively, the switches could be latching relays or the like which remain in their last switched state until unlatched, and the charge sensor could store that configuration in memory to know which switches would need to be toggled the next time a UAV arrives for recharging. While latching relays could be used under certain conditions, they introduce added complexity and are not presently preferred. The general issue with using latching relays is that once the residual voltage is detected and appropriate relays (switches) are closed, the voltage from the power supply necessarily provides appropriate voltage to keep those relays in the closed position. In such a case, some other type of electrical component would be required to receive communication to know that a UAV no longer required the power supply and would need to break that connection.

In some embodiments, upon contact with the charging pads 530A-C, a residual voltage (e.g., between 12 and 25 volts) from the polarized contacts 602A-B can be detected. Based on the residual voltage, the charge sensor 532 can toggle the switches such the charging pads 530A-C have the appropriate polarity. It should also be readily understood that, while the charge sensor 532 is depicted in FIG. 22 as incorporating switches for ensuring the correct coupling between the power supply 534 and the BMS 620, the same is preferably accomplished through appropriate logic rather than mechanical or electromechanical switches.

Figure 23:
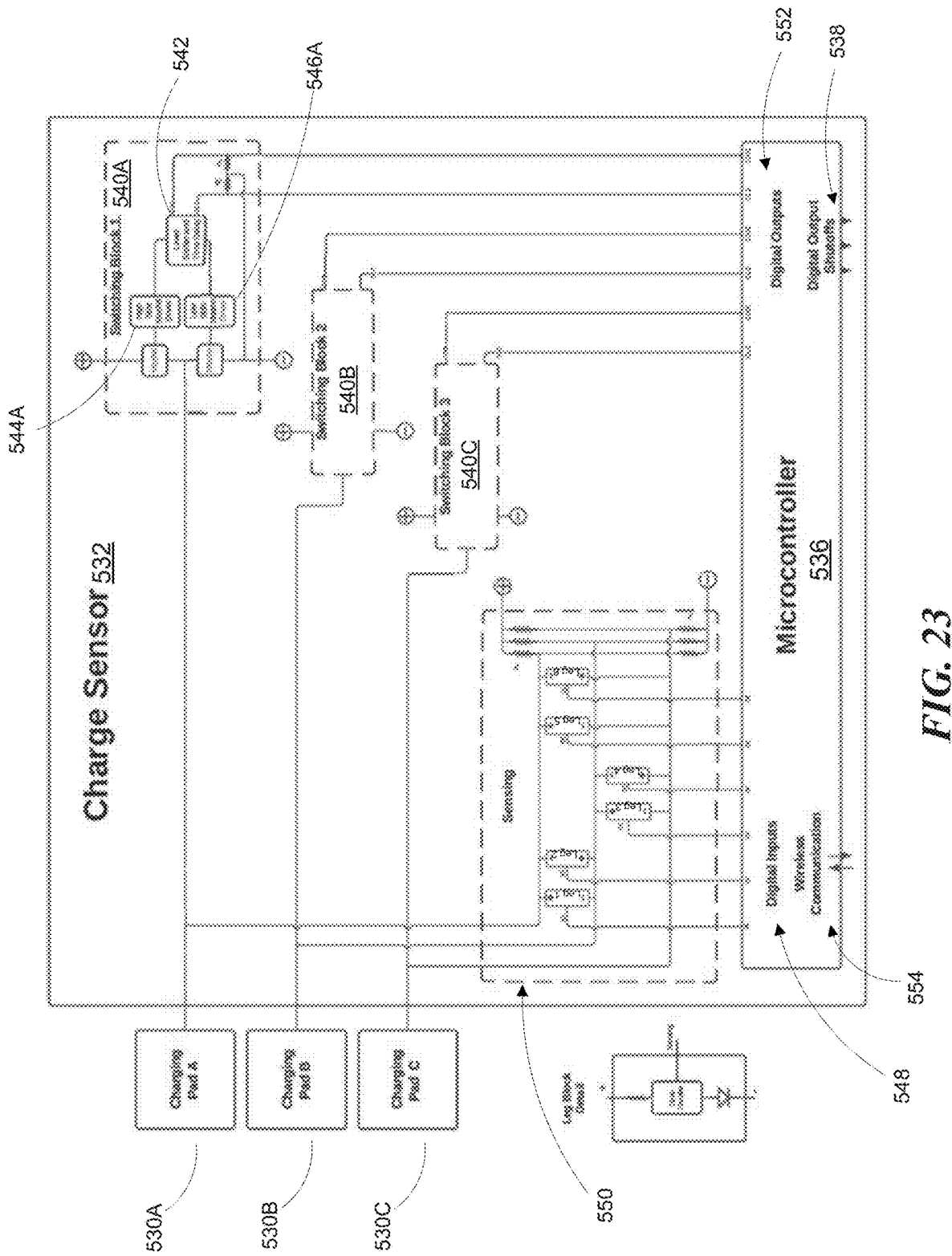
FIG. 23 illustrates a high-level layout of the charge sensor with charging pads.
Figure 24A:
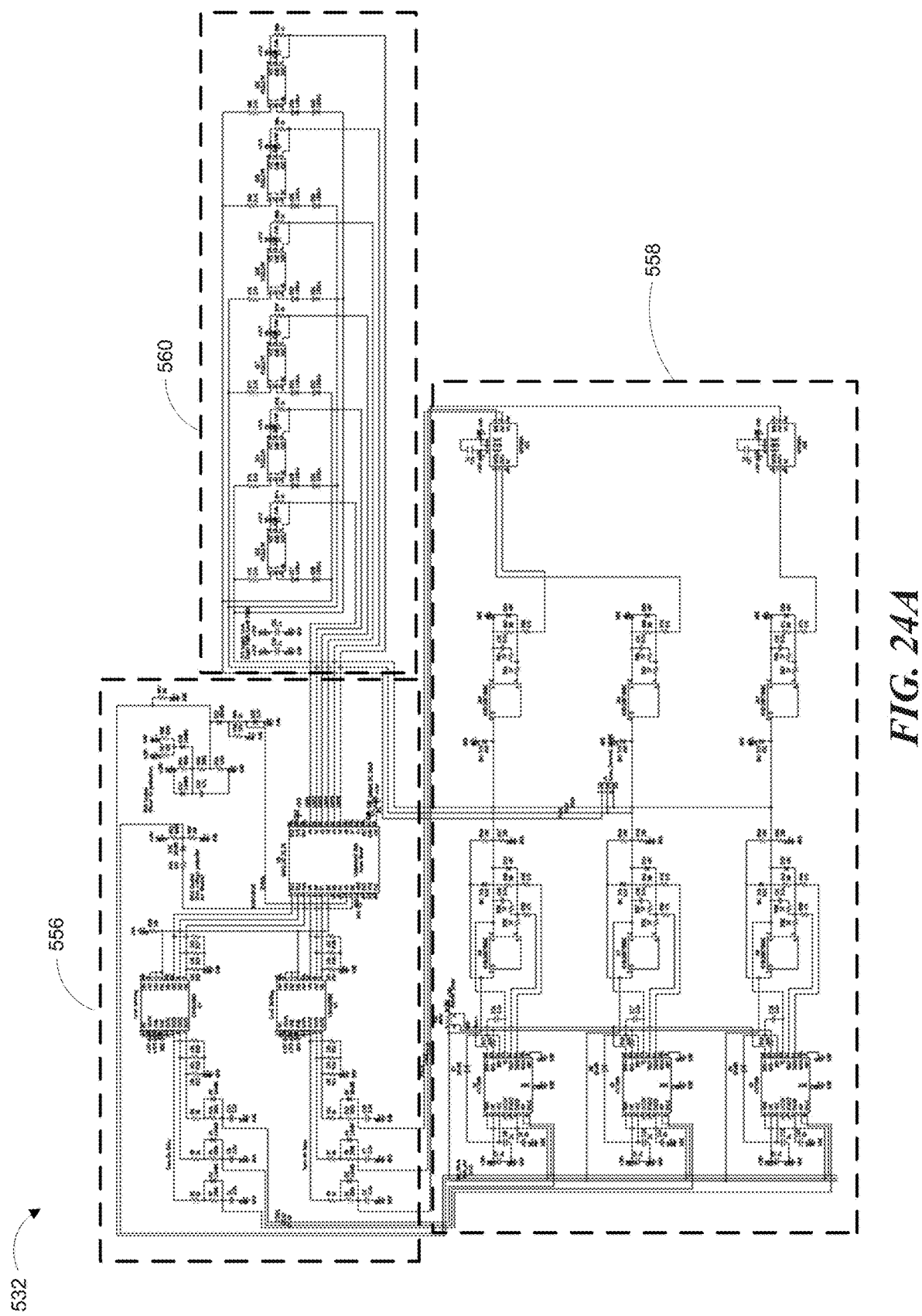
FIG. 24A illustrates a circuit diagram of the charge sensor.

FIG. 23 diagrammatically illustrates a layout of the charge sensor 532 with charging pads 530A-C. FIG. 23 can be best understood if described along with the schematic diagrams in FIGS. 24A-F. In particular, FIG. 24A illustrates a circuit diagram of the entire charge sensor and FIGS. 24B-F illustrate portions, 556, 558, and 560, of the charge sensor in a close-up view. In general, the microcontroller 536 can provide digital outputs 552 to the switching blocks 540A-C which can drive the polarity of charging pads 530A-C. Sensing block 550 can be driven by the residual voltage received from UAV 10 (not shown) when it lands on charging pads 530A-C and can provide the digital inputs 548 to the microcontroller 536.

Figure 24B:
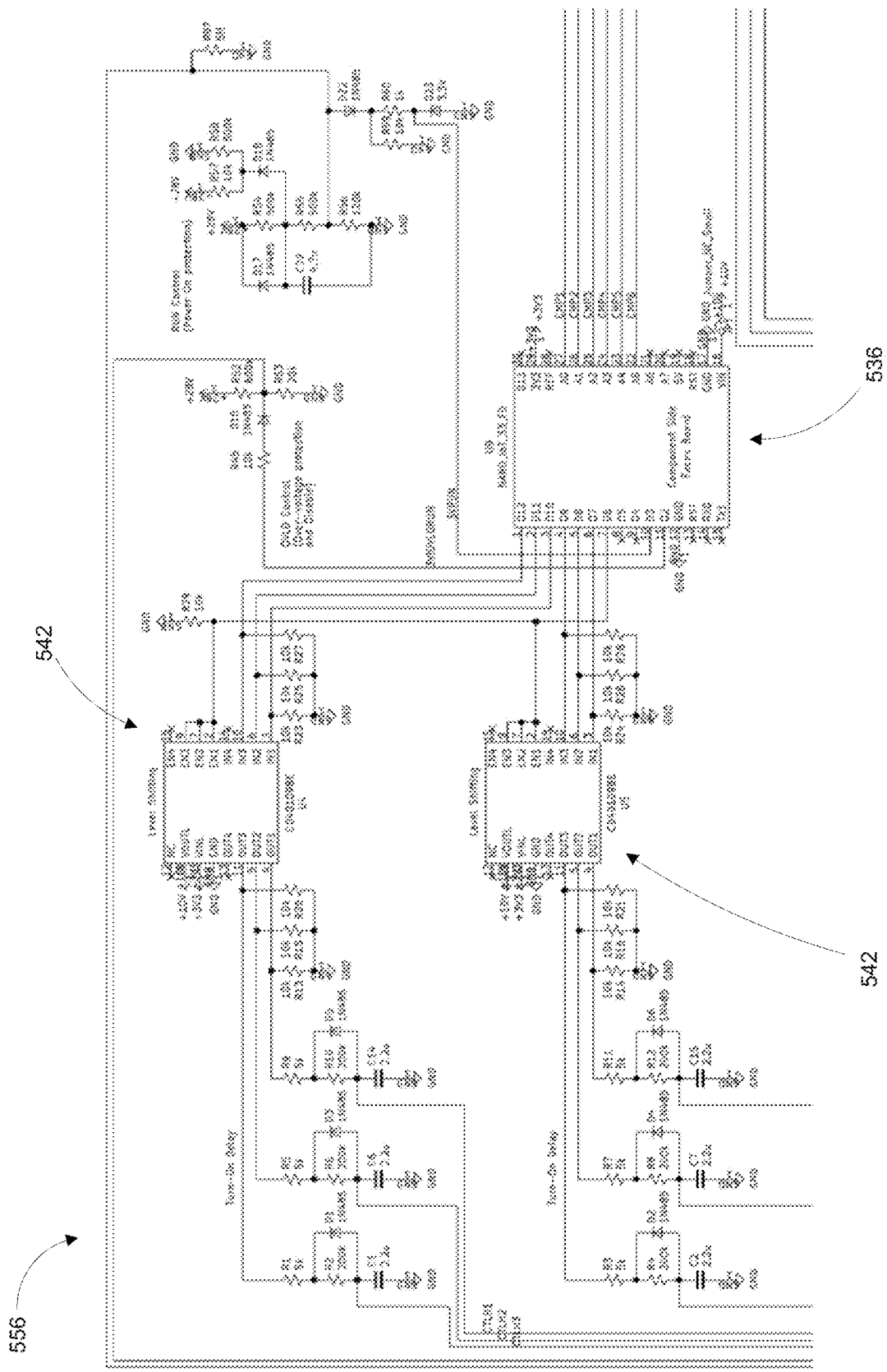
FIG. 24B illustrates first portion of the charge sensor's circuit diagram.

In some embodiments, the microcontroller 536 can be an Arduino Nano ABX00032. The digital outputs 552 from the microcontroller 536, as depicted in FIG. 24B, can drive the level shifting and time delay circuit 542. The level shifting and time delay circuit 542 can include, for example, two Texas Instruments CD40109BE chips. In some embodiments, level shifting and time delay circuit 542 can provide outputs for each of the switching blocks 540A-C, as depicted in FIG. 24A. Alternatively, as depicted in FIG. 23, each switching block 540A-C can include a dedicated level shifting and time delay circuit 542.

Figure 24C:
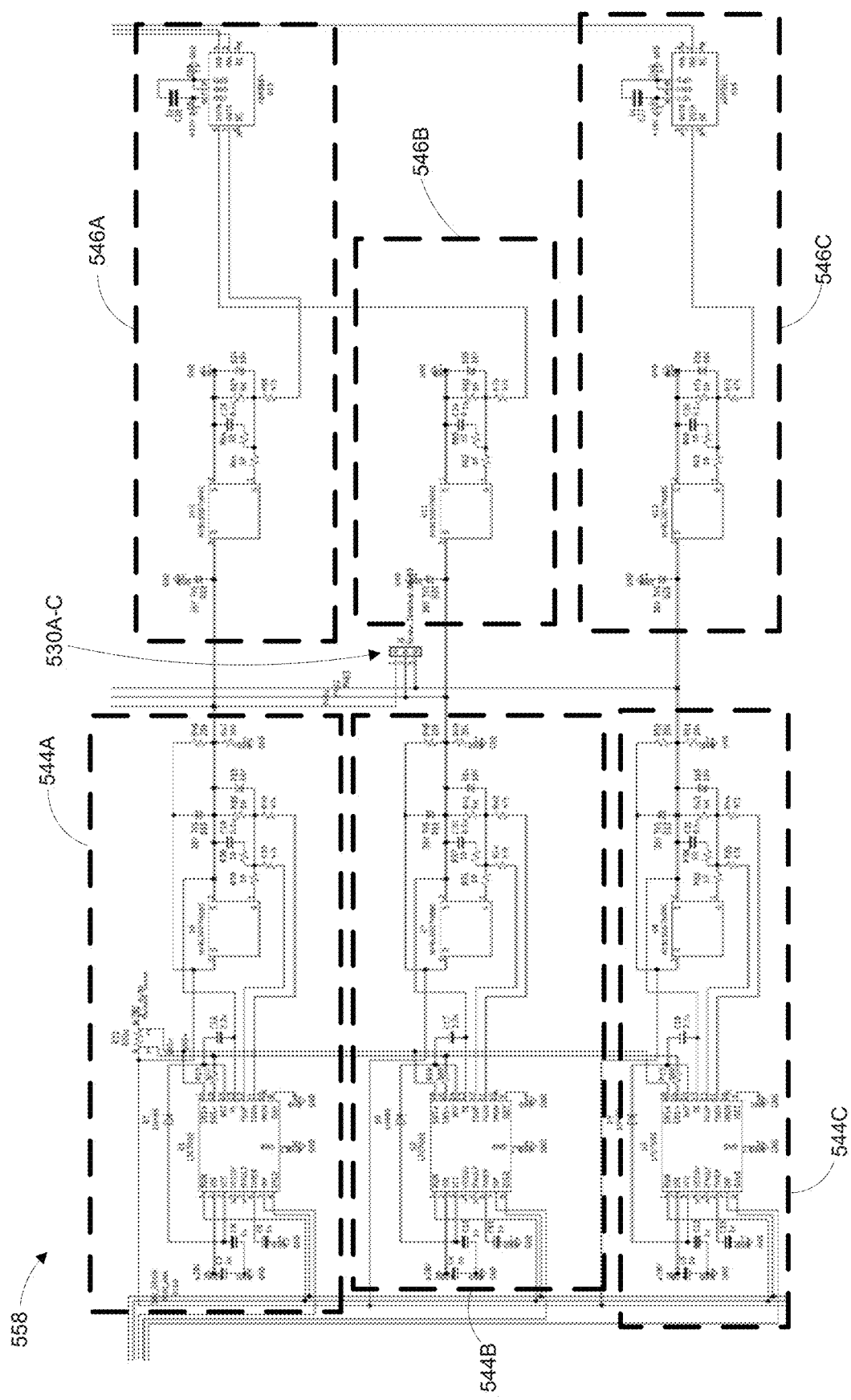
FIG. 24C illustrates a second portion of the charge sensor's circuit diagram.

The level shifting and timed delay circuit 542 can feed into the high side and low side MOSFET drivers 544A-C and 546A-C within each switching block 540A-C, respectively. As depicted in FIG. 24C, high side MOSFET drivers 544A-C can include a LTC7000IMSE#PBF chip available from Analog Devices and a MOSFET such as NVBLSOD7N06C available from ON Semiconductor. The low side MOSFET drivers 546A-B can include a MOSFET (e.g., NVBLSOD7N06C available from ON Semiconductor). In some embodiments, as depicted in FIG. 24C, two MOSFETs that are connected to the low side MOSFET drivers (546A-B in FIG. 24C) can be connected to single MOSFET driver integrated circuit with the capability of driving two MOSFETs, such as ADP3654 available from Analog Devices. Other variations are possible based on the capabilities (e.g., number of output pins) of the MOSFET driver chip.

Figure 24D:
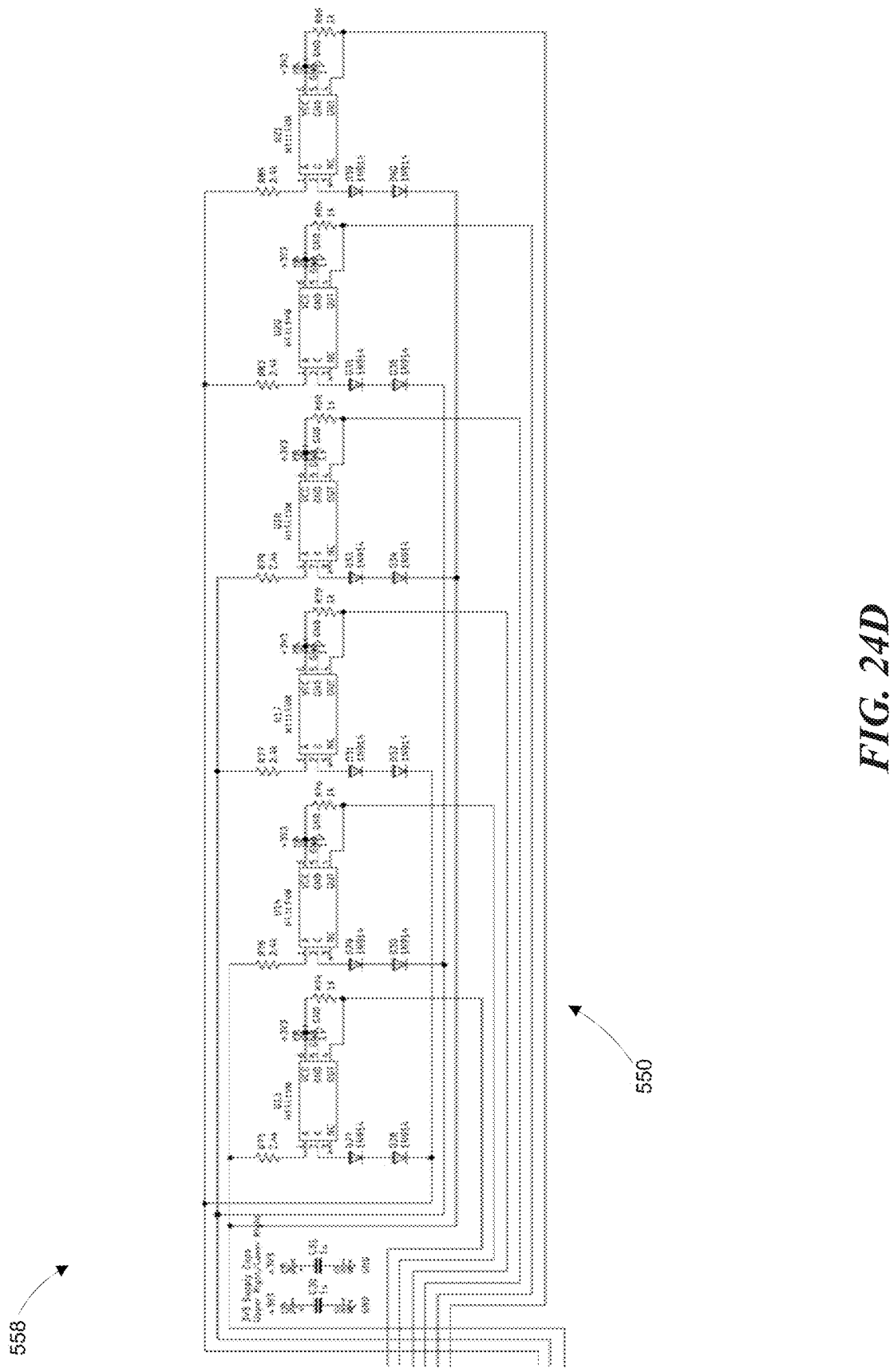
FIG. 24D illustrates a third portion of the charge sensor's circuit diagram.

The polarity of the charging pads 530A-C can be driven from the switching blocks 540A-C. As depicted in FIG. 24C the connections to the charging pads 530A-C can be interconnected between the high side MOSFET drivers 544A-C and low side MOSFET drivers 546A-C. Next, FIG. 24D depicts a close-up view of the sensing block 550. The sensing block 550 can include six legs, each comprising one optocoupler such as H11L1VM available from ON Semiconductor. The components of the sensing module 550, as mentioned above, can be driven by the residual voltage from a UAV 10 (not shown) to provide the digital inputs 548 to the microcontroller 536.

Figure 24E:
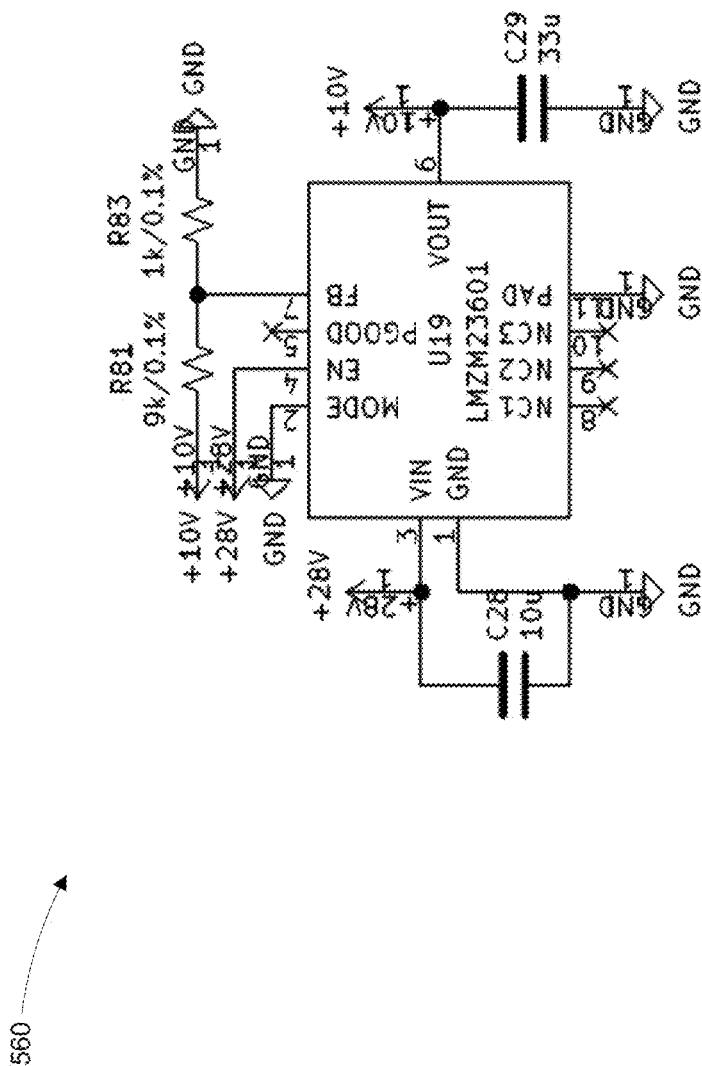
FIG. 24E illustrates a circuit diagram of one power supply for the charge sensor.
Figure 24F:
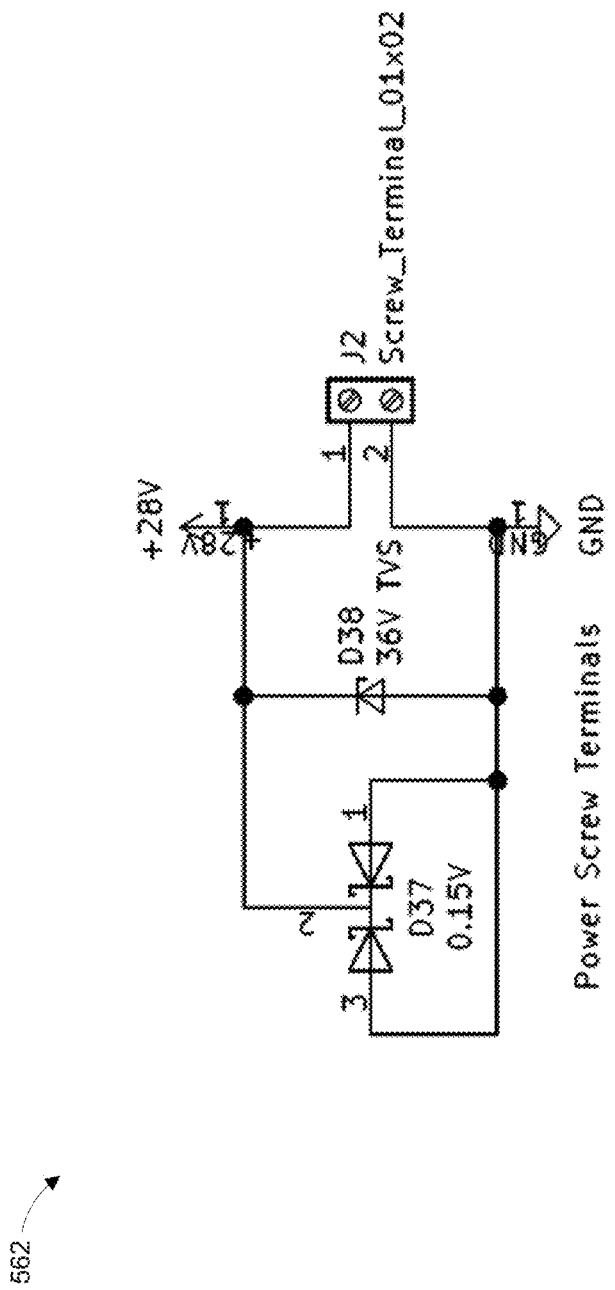
FIG. 24F illustrates a circuit diagram of the connection and associated protective circuitry to the AC-DC power supply of the charge sensor.

FIGS. 24E-F depict a power supply and protection circuits that provide suitable power for the charge sensor 532. FIG. 24E depicts a power supply 560 that can provide 10 volts and FIG. 24F depicts the connector and protection circuitry 562 for accepting power from the AC to DC power supply 534. For instance, power supply 560 can provide 10 volts to the microcontroller 536 and for all ICs using 10V logic and signaling. For instance, power connector and protection circuitry 562 can supply 28 volts to the high side and low side MOSFET drivers 544A-C and 546A-C and MOSFET switches to conduct to the selected charging pads 530.

The following description is an exemplary process that the charge sensor 532 can execute prior to when and after a UAV 10 (not shown) lands on the charging pads 530A-C. Prior to the UAV 10 landing on a charging pad 530A-C, the microcontroller 536 can disable switching via a series of digital output shutoffs 538 that output to each switching block 540A-C. Once the UAV 10 lands on a charging pad 530A-C, the polarized contacts 602A-B on the UAV 10 polarize the charging pads 530A-C with polarized power provide from a battery of the UAV 10. The polarized power creates a voltage differential between the charging pads 530A-C on which the polarized contacts 602A-B land on. The third charging pad 530A-C, on which the polarized contacts 602A-B do not make contact, can be electrically connected to the circuit to create a voltage divider and settle into voltage that is, generally, halfway between the voltages of the polarized contacts 602A-B.

Subsequently, the sensing block 550 can electrically react to the polarization of the charging pads 530A-C and provide a digital output from optocouplers that feed into the six digital inputs 548 of the microcontroller 536. The software logic of the microcontroller 536 can then determine polarization by reading the digital inputs 552 from the sensing block 550. Once the polarization is determined, the microcontroller 536 can turn off the digital output shutoffs 538, which allows the switching blocks 540A-C to receive control signals. The microcontroller 536 can then determine which switches to activate in the switching blocks 540A-C and can drive these switches using the control high and control low digital outputs 552.

Once the switching blocks 540A-C receive the control signals from the microcontroller 536, the switching block 540A-C can be activated to allow positive and negative power from the power supply (not shown) to be routed to the charging pads 530A-C in the manner that they were initially polarized. Subsequently, the battery onboard the UAV 10 gets recharged. At a later time, the UAV 10 may initiate a takeoff sequence and the polarized contact 602A-B can separate from charging pads 530A-C. The microcontroller 536 can be notified via the wireless communication protocol 554 to disable the switches and the power from the power supply are disconnected from the charging pads 530A-C. Thus, the charge sensor 532 can be ready to accept a new UAV 10 landing with different or similar polarization.

Continuing with the above example, on the drone side, the polarized contacts 602A-B receive the polarized power supply and transfer energy from the power supply to the BMS 620, which can direct the received power to the appropriate terminals of the rechargeable battery 652. Generally, BMS 620 can include a combination of a memory and a processor. This combination can be implemented as a microcontroller with metal-oxide semiconductor field-effect transistor (MOSFETs) and other electrical components.

Figure 25B:
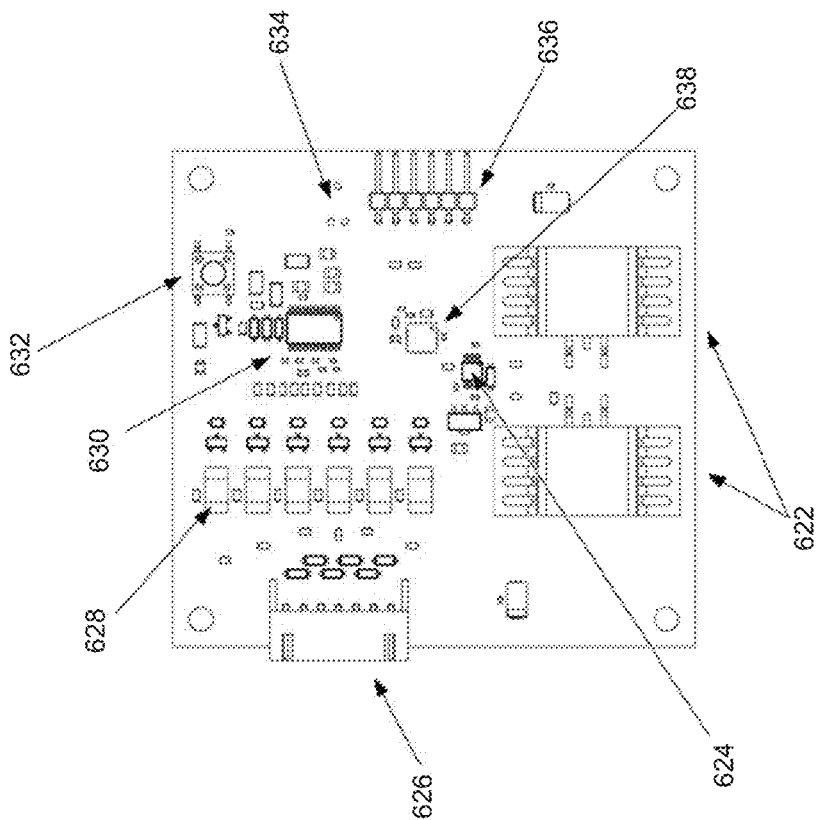
FIG. 25B illustrates a component view of the recharge battery board.
Figure 25A:
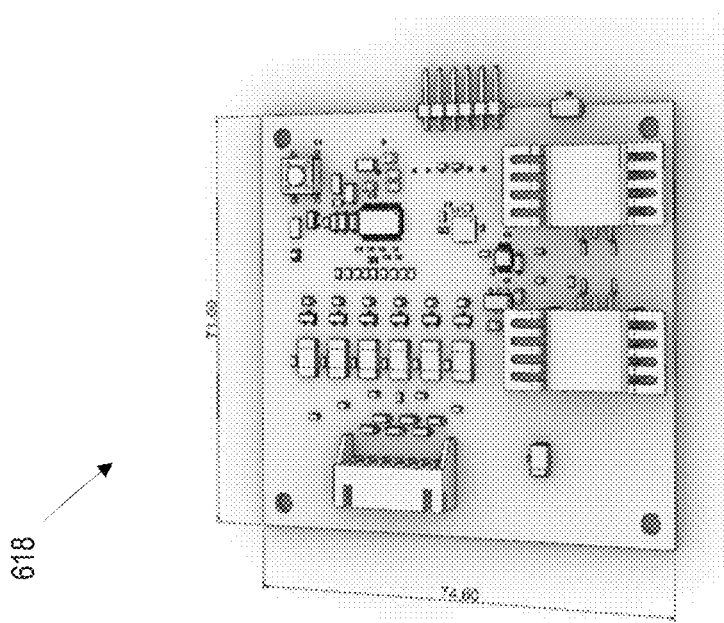
FIG. 25A illustrates a top-down view of the printed circuit board (PCB) of a rechargeable battery board.

FIGS. 25A-F depict the components of the rechargeable battery board 618 including BMS 620 and battery monitor 630. It should be appreciated that the rechargeable battery board 618 preferably resides on the UAV itself. As shown in FIG. 25A-B, battery board 618 can include MOSFETs 622, MOSFET driver 624, a connector 626, burn resistors 628, a battery monitor 630, an activation button 632, hexadecimal programming interface pins 634, 3V Universal Asynchronous Receiver/Transmitter (UART) 636, and a microcontroller 638. In some embodiments, the IC chip of the battery monitor 630 can be a chip manufactured by Texas Instruments such as product number BQ7693006DBTR. In some embodiments, the microcontroller 638 can be manufactured by Microchip Technology such as product number PIC16F18326T-I/JQCT-ND.

Figure 25C:
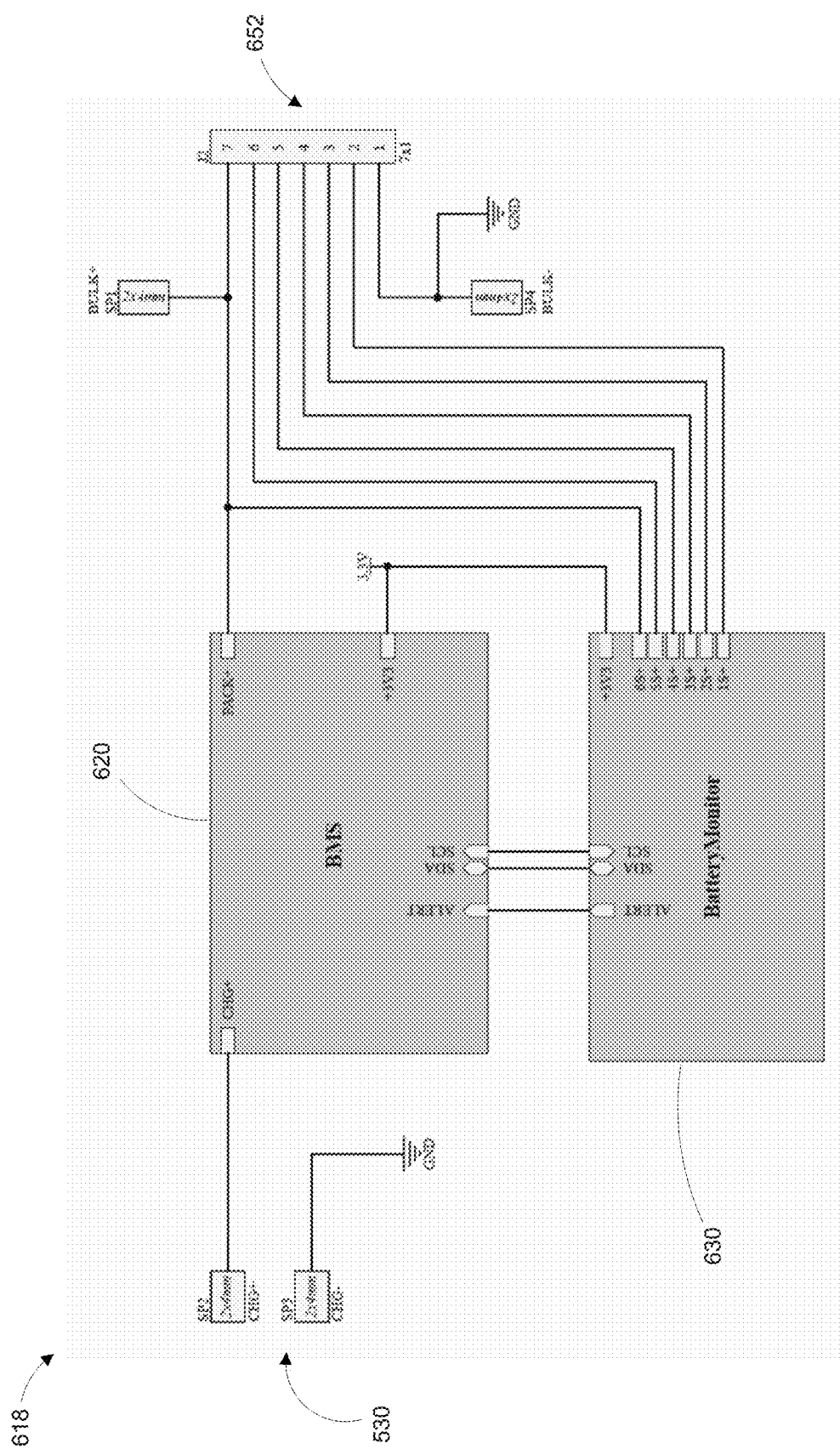
FIG. 25C illustrates an exemplary block diagram of a rechargeable battery board within an unmanned aerial vehicle.

FIG. 25C depicts a high-level block diagram of the rechargeable battery board 618, which includes the BMS 620 and battery monitor 630. At a high-level, the BMS 620 can communicate with the battery monitor 630, monitor conditions of the battery (not shown) and rechargeable battery board 618, and perform actions based on logic programmed into a microcontroller. As a result, an output (CHG− to SP3) of the BMS 620 leads, via the polarized contacts 602A-B, to the two charging pads 530 on which the UAV 10 has landed. On the other end of the BMS 620, there can be connections, SP1, SP4, and J2 652 to the battery 650 (not shown). At J2, the cells of the battery can be connected, for example, in series to the battery monitor 630.

The battery monitor 630 can interconnect the BMS 620 with the battery 650 (not shown) and communicate with the BMS 620. The interconnections between the BMS 620 and battery monitor 630 include "Alert", "SDA", and "SCL". These interconnections can facilitate communication between the BMS 620 and battery monitor 630 through, for example, the I$^2$C protocol. The communications can include diagnostic information about the battery (not shown) such as temperature and voltage readings.

Figure 25D:
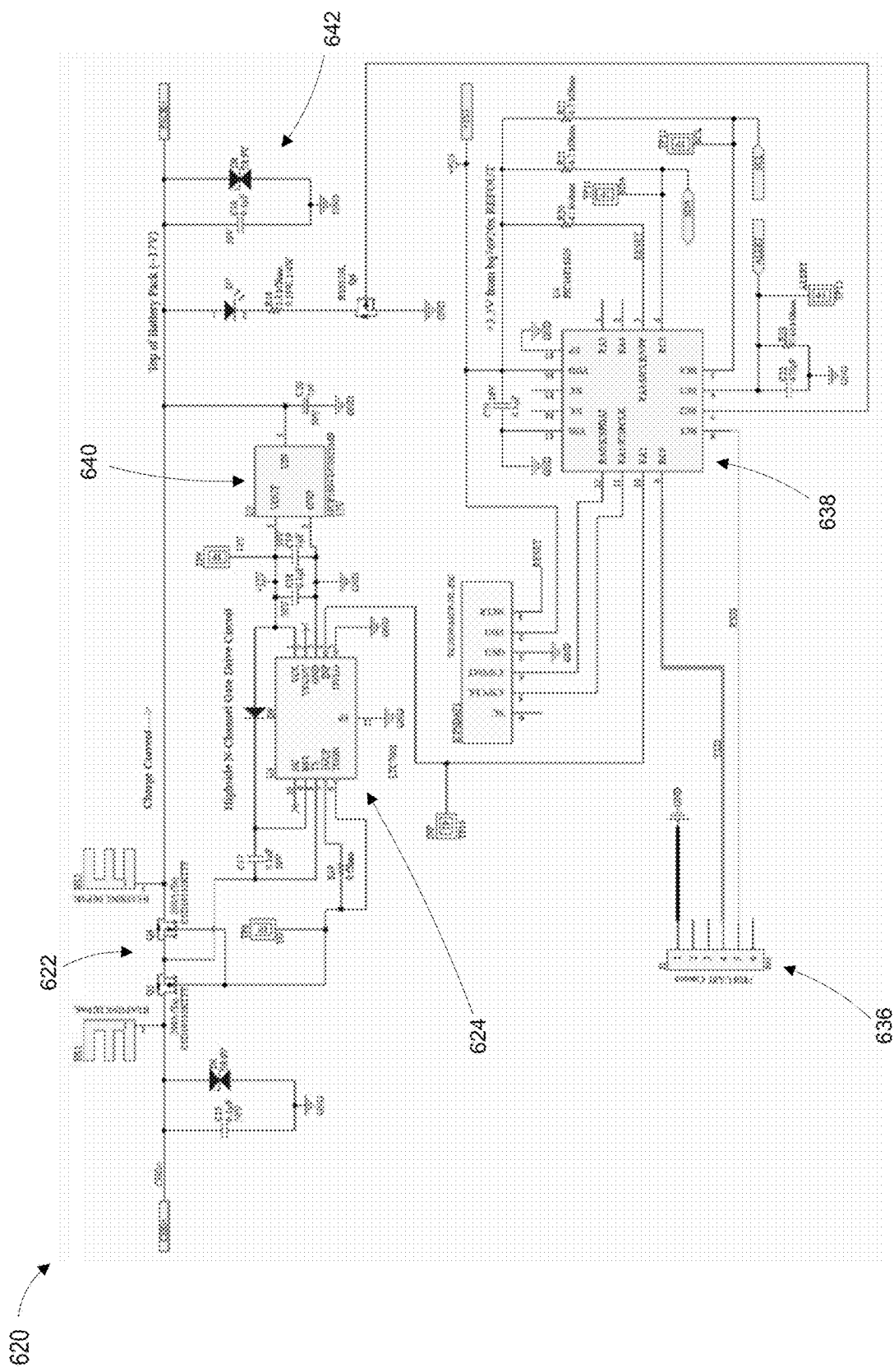
FIG. 25D illustrates a circuit diagram of the battery management system.

FIG. 25D depicts a circuit diagram of the BMS 620. The BMS 620 can include microcontroller 638 which can execute logic to supply the polarized power from the charging pads 530A-C to the onboard battery (not shown) on the UAV 10. The MOSFET driver 624 can communicate with the microcontroller 638 and control charging of the battery via the activation of the MOSFETs 622. The MOSFET driver can be, for example, an LTC70001 chip available from Analog Devices. The voltage regulator 640 can be, for example, MCP1804T-C002I/MB available from MicroChip. Additionally, an output of the MOSFET driver 624 can, via MOSFETs 622, affect the voltage at the CHG+ pin of the BMS 620. As mentioned above, the CHG+ of the BMS 620 can lead to the charging pads 530A-C via the polarized contacts 602A-B. Further, the BMS 620 can include diodes and LEDs 642 which can indicate, for example, that the BMS 620 is ON.

In some embodiments, the microcontroller 638 can have ten modes of operation. The modes may be entered into in any order, and not only in the order described below. Moreover, the UAV 10 (not shown) can connect and disconnect with the charging pads 530A-C (not shown) while the microcontroller 638 is operating in any of the following modes. A preferred first mode of operation can be a checking mode. In this first checking mode, the microcontroller 638 can check for various diagnostic information. For example, the microcontroller 638 can check whether the battery is being charged, the temperature of the cells of the battery and components of battery board 618, the voltage of each cell in the battery, and other similar diagnostic information. In some embodiments, the microcontroller 638 can determine the difference between the highest voltage and lowest voltage of the cells of the battery. The difference can be a factor in the speed in which each cell receives charge. For example, if the difference is large, the charging may occur at a lower duty cycle or may be shut down until the difference is smaller. Alternatively, if the difference is small the charging may occur at full speed.

In a second mode, which can be referred to as the charge mode, the microcontroller 638 permits charge to flow to the cells of the battery. In this mode, the microcontroller 638 may not make any measurements. Thus, in some embodiments, the flow of charge can be interrupted at predetermined periods (e.g., every minute) to allow the microcontroller 638 to enter the first mode and take measurements. If the measurements do not indicate an error, the microcontroller 638 can reenter the second mode. Alternatively, if there is an error, microcontroller 638 can enter another mode. The third mode, referred to as a balance mode, can be triggered when the difference between the high and low voltages, described above, exceeds a threshold value. In the third mode, the charging can be turned off until the difference is below the threshold or all the cells of the battery are below a threshold voltage such as 4-5V.

The fifth mode, which can be referred to as a storage mode, can be triggered when, for example, the voltage of a cell is high for a long period. For example, if the UAV 10 has not operated for a few months. In this mode, the battery can be drained such that the cells are not stored at full capacity for extended periods of time. The sixth mode, which can be referred to as a hot mode, can be triggered when the temperature of a component of the battery board 618 or the battery exceeds a threshold. Once triggered, the charging can be turned off until the temperature returns to a level below the threshold. Similarly, a seventh mode, referred to as the cold mode, can be triggered when the temperature of a component of battery board 618 or battery falls below a threshold. In this case, microcontroller 638 can delay charging until the temperature returns above the threshold.

The eight mode, referred to as high mode, can be triggered when the voltage of a cell of the battery is too high. When this occurs, the charging is turned off and balancing components 646 can drain voltage from the cell. The ninth mode, referred to as the dead mode, can be triggered when the voltage of a cell is too low. For example, if the voltage in a cell falls below 1V, the dead mode can be triggered. Lastly, the tenth mode, referred to as the pause mode, can be manually triggered to enable monitoring of the system.

Figure 25E:
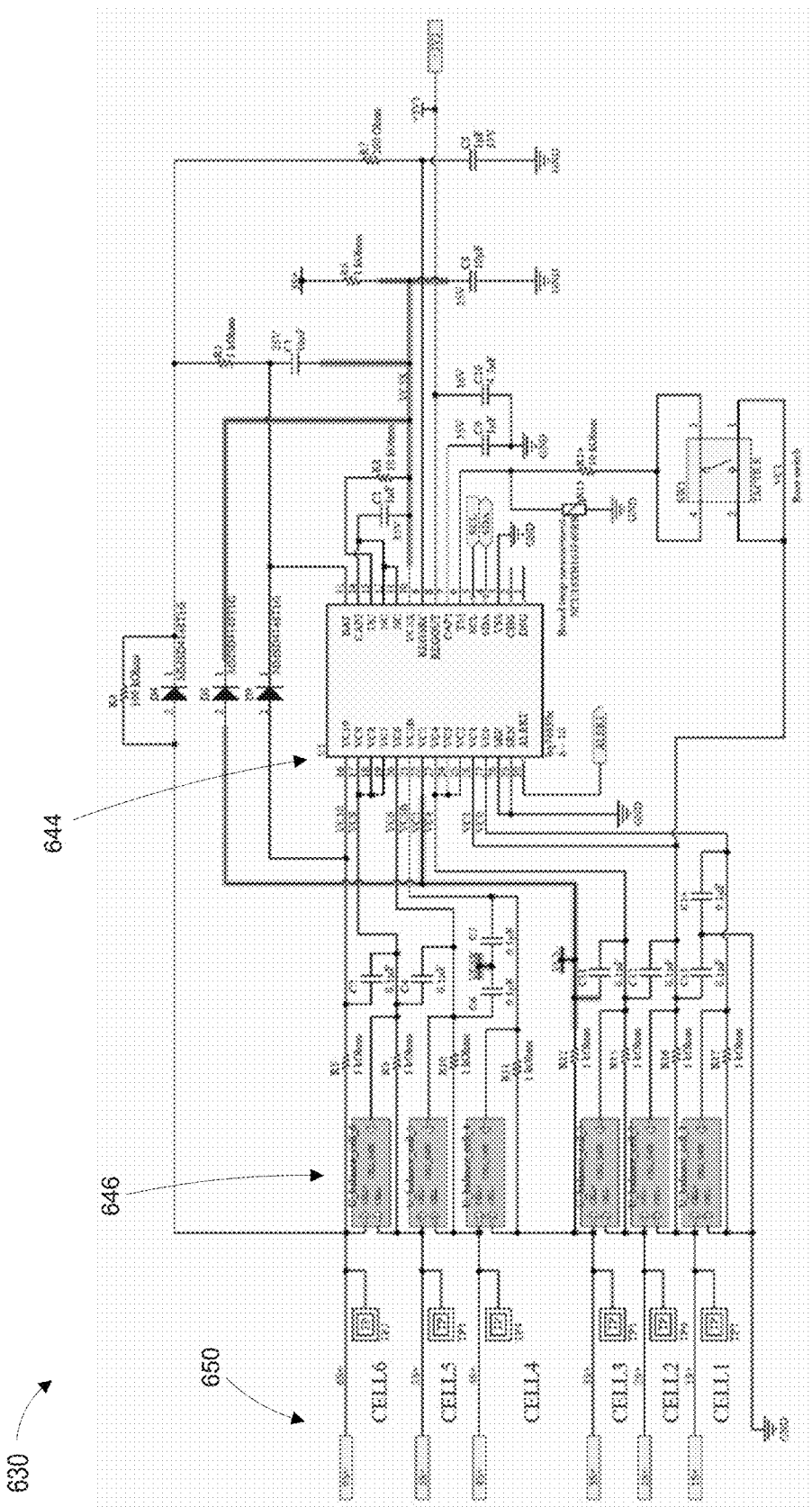
FIG. 25E illustrates a circuit diagram of the battery monitor system.

FIG. 25E depicts a circuit diagram of the battery monitor 630. Battery monitor 630 includes battery monitor chip 644, balancing components 646, and other circuit components. One end of the battery monitor 630 can be connected to the cells of the battery 650. In some embodiments, each branch of the balancing components 646 can connect one cell of the battery. Alternatively, each branch can connect to multiple cells that are connected in parallel. The battery monitor chip 644 can be, for example, a BQ7693006DBTR chip available from Texas Instruments.

The battery monitor chip 644 can be capable of measuring current, temperature, and/or battery voltage. The battery monitor chip 644 can also provide protections for the battery 650 such as programmable current, voltage and temperature thresholds. In some embodiments, if one or more threshold values are exceeded, the battery monitor chip 644 can, for example, shut off current to the battery 650 or perform a delay operation. The battery monitor chip 644 can also have multiple power modes such as normal, sleep, and shutdown.

Figure 25F:
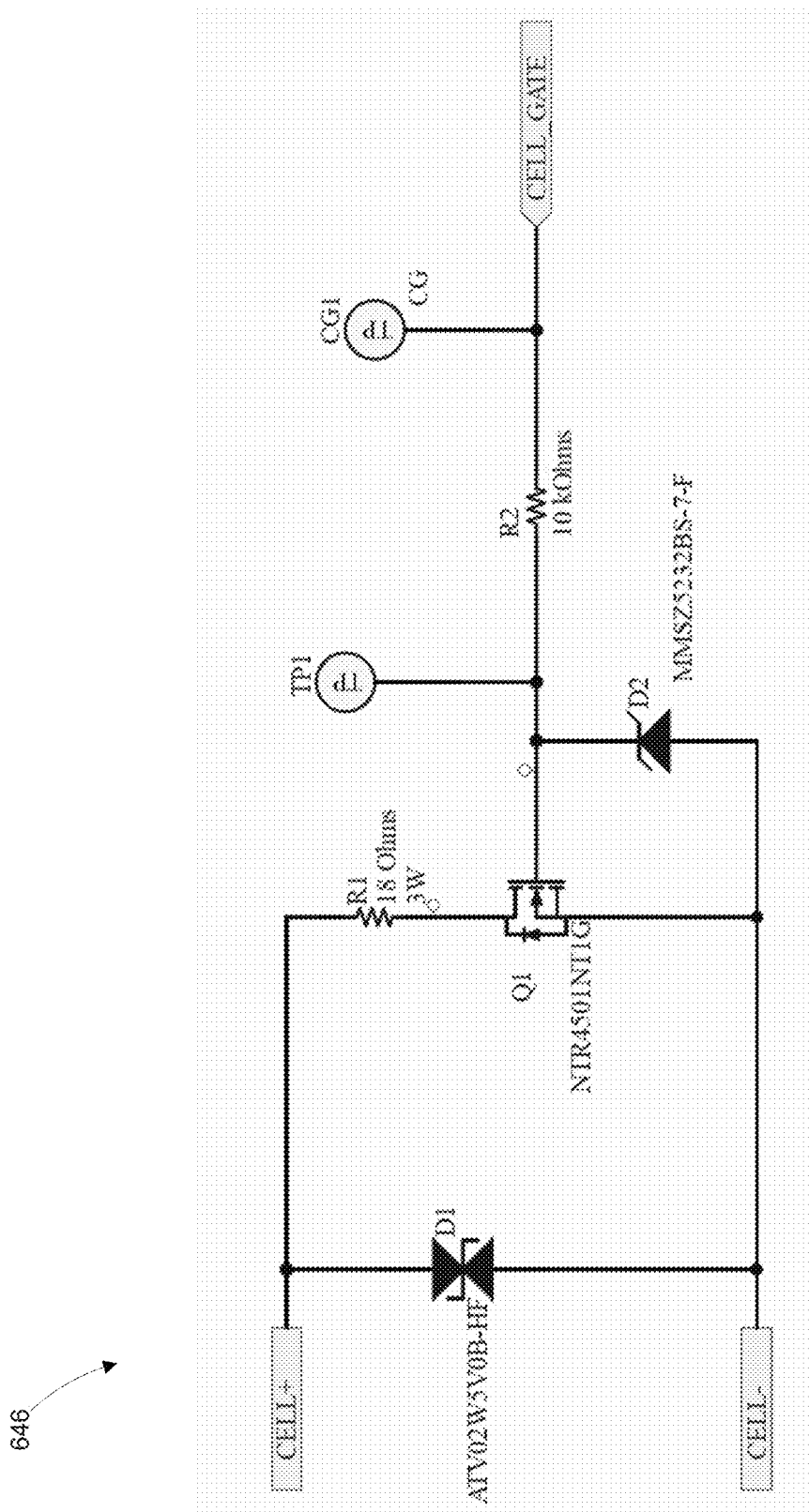
FIG. 25F illustrates a close up circuit diagram of the balancing circuit of the battery monitor system.

FIG. 25F depicts a close up circuit diagram of one branch of the balancing components 646 of the battery monitor system. The balancing components 646 can include a combination of electrical components which drain the battery cells when necessary. For example, the battery monitor chip 644 can detect a voltage value higher than a predetermined threshold in a certain cell of the battery. The balancing components 646 can drain the battery by opening a gate (Cell_Gate) to bring the voltage below the threshold.

Computer System and Device Architecture

Figure 26:
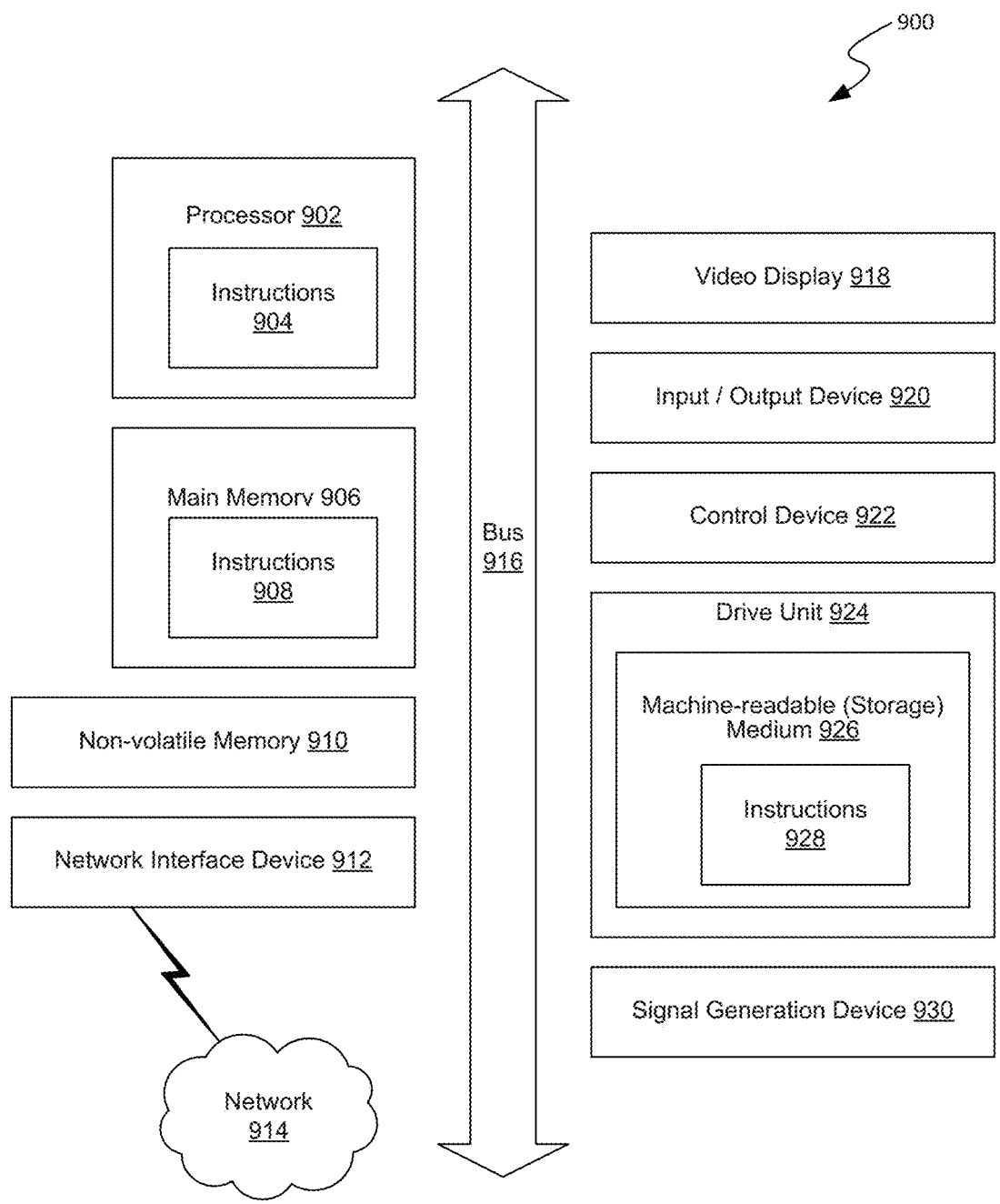
FIG. 26 is a high-level block diagram showing an example of a system in which at least some operations related to the techniques introduced here can be implemented.

FIG. 26 is a block diagram illustrating an example of a computing system 900 in which at least some operations described herein can be implemented. For example, some components of the computing system 900 utilized to implement a computing device (e.g., charge sensor 532).

The computing system 900 may include one or more central processing units (also referred to as "processors") 902, main memory 906, non-volatile memory 910, network adapter 912 (e.g., network interface), video display 918, input/output devices 920, control device 922 (e.g., keyboard and pointing devices), drive unit 924 including a storage medium 926, and signal generation device 930 that are communicatively connected to a bus 916. The bus 916 is illustrated as an abstraction that represents one or more physical buses and/or point-to-point connections that are connected by appropriate bridges, adapters, or controllers. The bus 916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computing system 900 may share a similar computer processor architecture as that of a personal computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computing system 900.

While the main memory 906, non-volatile memory 910, and storage medium 926 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 928. The term "machine-readable medium" and "storage medium" shall also be taken to include any medium that is capable of storing, encoding, or carrying a set of instructions for execution by the computing system 900.

In general, the routines executed to implement the embodiments of the disclosure may be implemented as part of an operating system or a specific application, component, program, object, module, or sequence of instructions (collectively referred to as "computer programs"). The computer programs typically comprise one or more instructions set at various times in various memory and storage devices in a computing device. When read and executed by the one or more processors 902, the instruction(s) cause the computing system 900 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 910, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 912 enables the computing system 900 to mediate data in a network 914 with an entity that is external to the computing system 900 through any communication protocol supported by the computing system 900 and the external entity. The network adapter 912 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 912 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. A recharging station adapted to accommodate an aerial vehicle that is separate from the recharging station, comprising:
    a landing platform including multiple conductive regions;
    a power supply having a positive terminal and a negative terminal; and
    a charge sensor electrically interconnected between the multiple conductive regions and the power supply, the charge sensor configured, upon receipt of two polarized contacts from the aerial vehicle by different conductive regions of the recharging station, to electrically couple the positive terminal to a positively polarized contact of the aerial vehicle and the negative terminal to a negatively polarized contact of the aerial vehicle to allow an onboard battery source of the aerial vehicle to be recharged by the power supply, wherein the charge sensor further comprises: a first plurality of switches, each interconnected between the positive terminal and a respective one of the conductive regions of the multiple conductive regions; and a second plurality switches, each interconnected between the negative terminal and a respective one of the conductive regions of the multiple conductive regions.

2. The recharging station of claim 1, wherein the landing platform is discoidal, and wherein the multiple conductive regions are equiangularly distributed about the landing platform and substantially equally sized.

3. The recharging station of claim 1, wherein each of said multiple conductive regions has a largest dimension which is less than a distance between the two polarized contacts, thereby ensuring the two polarized contacts cannot simultaneously contact a single conductive region.

4. The recharging station of claim 1, further comprising:
    an infrared emitter configured to guide the aerial vehicle onto the landing platform.

5. The recharging station of claim 1, further comprising:
    an automated mechanism configured to raise and lower the landing platform between a stowed position and a deployed position.

6. The recharging station of claim 1, further comprising:
    a hatch configured to move between an open position and a closed position, wherein the hatch is configured to cover a topside of the landing platform in the closed position.

7. The recharging station of claim 1, wherein the charge sensor is mounted to an underside of the landing platform.

8. The recharging station of claim 1, wherein the charge sensor is further configured to:
    detect a residual voltage from the two polarized contacts.

9. The recharging station of claim 1, wherein the first plurality of switches and the second plurality of switches each comprise three switches.

10. The recharging station of claim 1, wherein upon receipt of the two polarized contacts by a first conductive region and a second conductive region, the charge sensor is configured to close one or more of said first plurality of switches and said second plurality of switches to electrically couple the positive terminal to the positively polarized contact and the negative terminal to the negatively polarized contact.

11. The recharging station of claim 1, wherein the first plurality of switches is connected in parallel, and wherein the second plurality of switches is connected in parallel.

12. The recharging station of claim 1, further comprising:
a communications module configured to establish a first communication channel with the aerial vehicle.

13. The recharging station of claim 12, wherein the communication module is further configured to:
establish a second communication channel with a remote base station.

14. The recharging station of claim 1, wherein the power supply is a 750-watt AC to DC power supply which operates at a 1-C charge rate.

15. A method for recharging an onboard battery of an aerial vehicle upon arrival at a recharging station, wherein said recharging station is separate from the aerial vehicle and includes a landing platform having multiple conductive regions, and a power supply, said method; comprising:
receiving two polarized contacts from the aerial vehicle, each at a respective one of the multiple conductive regions of the recharging station; and coupling a positively polarized one of the two polarized contacts of the aerial vehicle to a positive terminal of the power supply, and a negatively polarized one of the two polarized contacts of the recharging station to a negative terminal of the power supply, thereby allowing said onboard battery to be recharged by said power supply, wherein the charge sensor further comprises: a first plurality of switches, each interconnected between the positive terminal and a respective one of the conductive regions of the multiple conductive regions; and a second plurality switches, each interconnected between the negative terminal and a respective one of the conductive regions of the multiple conductive regions.

16. The method of claim 15, wherein coupling further comprises:
actuating one or more switches, wherein each of the one or more switches is interconnected between a respective terminal of the power supply and at least one of said conductive regions.

17. The method of claim 15, wherein receiving the two polarized contacts further comprises:
detecting a residual voltage from the polarized contacts.

18. The method of claim 17, further comprising:
in response to receiving the polarized contacts and not detecting a residual voltage, transmitting, by a communications module, an error message to the remote base station over the communication channel.

19. The method of claim 15, wherein the charge sensor is interconnected between the multiple conductive regions and the power supply.

20. A recharging system comprising: multiple conductive regions adapted to be disposed on a landing platform; a power supply including a positive terminal and a negative terminal; and a charge sensor electrically interconnected between the multiple conductive regions and the power supply, the charge sensor configured, upon receipt of two polarized contacts from an aerial vehicle by different conductive regions, to electrically couple the positive terminal to a positively polarized contact and the negative terminal to a negatively polarized contact to allow a battery source from the aerial vehicle to the recharged, and wherein the aerial vehicle is separate from said recharging system, wherein the charge sensor further comprises: a first plurality of switches, each interconnected between the positive terminal and a respective one of the conductive regions of the multiple conductive regions; and a second plurality switches, each interconnected between the negative terminal and a respective one of the conductive regions of the multiple conductive regions.

21. The recharging system of claim 20, wherein the recharging system is a part of a recharging station configured as an aerial vehicle port.

22. The recharging system of claim 21, wherein the recharging system further includes the landing platform.

23. The recharging system of claim 20, wherein the recharging system further comprises the positively polarized contact and the negatively polarized contact.

24. The recharging system of claim 20, wherein each conductive region has a largest dimension which is less than a distance between the two polarized contacts, thereby ensuring the two polarized contacts cannot be in a single conductive region.

25. The recharging system of claim 20, wherein the multiple conductive regions are not in physical contact with each other.

26. The recharging system of claim 20, wherein the landing platform is discoidal, and wherein the multiple conductive regions are equiangularly distributed and substantially equally sized.

27. The recharging system of claim 20, wherein the charge sensor is further configured to:
actuate one or more switches to interconnect the positive terminal to the positively polarized contact and the negative terminal to the negatively polarized contact.

28. The recharging system of claim 20, wherein the charge sensor is further configured to:
detect a residual voltage from the polarized contacts.

* * * * *